(12) United States Patent
Lane et al.

(10) Patent No.: US 10,306,735 B2
(45) Date of Patent: May 28, 2019

(54) EMERGENCY LIGHTING SYSTEM

(71) Applicant: Hubbell Incorporated, Shelton, CT (US)

(72) Inventors: John Lane, Simpsonville, SC (US); Allen George Cyr, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 25 days.

(21) Appl. No.: 15/487,600

(22) Filed: Apr. 14, 2017

(65) Prior Publication Data

US 2017/0299134 A1 Oct. 19, 2017

Related U.S. Application Data

(60) Provisional application No. 62/324,575, filed on Apr. 19, 2016.

(51) Int. Cl.
*H05B 37/02* (2006.01)
*H02J 7/00* (2006.01)
(Continued)

(52) U.S. Cl.
CPC ........ *H05B 37/0227* (2013.01); *H02J 7/0068* (2013.01); *H02J 9/065* (2013.01); *H05B 33/083* (2013.01); *H05B 37/0272* (2013.01)

(58) Field of Classification Search
CPC .............. F21Y 2115/10; F21Y 2101/00; F21Y 2105/10; F21Y 2105/12; F21Y 2113/13; F21Y 2113/17; F21K 9/23; F21K 9/232; F21K 9/175; F21K 9/238; F21K 9/27; F21K 9/60; F21K 9/61; F21K 9/90; H05B 33/0803; H05B 33/0863; H05B 33/0812;
(Continued)

(56) References Cited

U.S. PATENT DOCUMENTS 8,994,276 B2 * 3/2015 Recker ..................... H02J 9/02
315/160
2008/0258628 A1 * 10/2008 Higley ..................... F21S 9/022
315/86
(Continued)

OTHER PUBLICATIONS

PCT/US2017/027557 International Search Report and Written Opinion dated Jun. 26, 2017 (9 pages).

*Primary Examiner* — Tung X Le
*Assistant Examiner* — Borna Alaeddini
(74) *Attorney, Agent, or Firm* — Michael Best & Friedrich, LLP

(57) ABSTRACT

An emergency lighting system includes an input, a charging circuit, an auxiliary power supply, a plurality of lights, a driver, and a controller. The input is configured to receive a line voltage. The charging circuit is configured to receive the line voltage and output a charging voltage. The auxiliary power supply is configured to receive the charging voltage. The plurality of lights include a first group of lights and a second group of lights. The driver is configured to provide power to the plurality of lights. The controller is configured to monitor the line voltage, compare the line voltage to a threshold, control the driver to provide power to the first group of lights and the second group of lights when the input voltage is above the threshold, and provide power to the second group of lights when the input voltage is below the threshold.

11 Claims, 23 Drawing Sheets

(51) Int. Cl.
*H02J 9/06* (2006.01)
*H05B 33/08* (2006.01)

(58) Field of Classification Search
CPC ............ H05B 33/0857; H05B 33/0872; H05B
33/0809; H05B 33/0842; H05B 33/0854;
H05B 33/086; H05B 35/00; H05B
37/029; H05B 37/27; H05B 37/45; H05B
37/81; H05B 37/04; Y02B 20/343; Y02B
20/383; Y02B 20/386; Y02B 20/72
See application file for complete search history.

(56) References Cited

U.S. PATENT DOCUMENTS

| | | | | |
|---|---|---|---|---|
| 2009/0021077 | A1* | 1/2009 | Zilberberg | H02J 9/065 |
| | | | | 307/66 |
| 2010/0327766 | A1* | 12/2010 | Recker | H02J 7/025 |
| | | | | 315/291 |
| 2011/0084588 | A1* | 4/2011 | Chang | F21V 13/04 |
| | | | | 313/113 |
| 2012/0032708 | A1 | 2/2012 | Coleman | |
| 2012/0032728 | A1 | 2/2012 | Coleman et al. | |
| 2015/0015076 | A1* | 1/2015 | Park | H02J 7/0018 |
| | | | | 307/66 |
| 2018/0331567 | A1* | 11/2018 | Beghelli | H02J 9/065 |

* cited by examiner

EMERGENCY LIGHTING SYSTEM

RELATED APPLICATIONS

The present application claims priority to U.S. Provisional Application No. 62/324,575, filed Apr. 19, 2016, the entire contents of which are hereby incorporated.

FIELD

The present invention relates to emergency lighting equipment.

SUMMARY

Emergency lighting equipment, units, and systems provide essential illumination coverage for individual buildings or building complexes in the event of failure of the mains power supply, for example, so evacuation can be performed safely. Emergency lighting units are typically used to light the path of egress such as corridors, walkways, stairways, and exits from the premises. In response to power outage or reduction, emergency lighting units automatically transfer to emergency mode, providing necessary illumination in assisting building evacuation.

Emergency lighting units detect the existence of an emergency condition by detecting a brown-out event. A brown-out event is a type of an emergency condition during which the mains voltage provided to a building is reduced. Brown-out events occur when the demand for electricity is fairly high so that the mains voltage is dropped from its nominal level due to heavy loads. The mains voltage level may be reduced to a point at which some of the normally-on lighting fixtures are not able to operate.

Traditionally, during a brown-out event, an emergency lighting unit provides power to all of the lights of the emergency lighting unit. In order to apply power to all the lights during brown-out event, the emergency lighting unit requires a large, expensive, high-capacity battery. Additionally, when applying power to all the lights during a brown-out event, wasted light is used outside a typical emergency lighting distribution area.

Therefore, in one embodiment, the application provides an emergency lighting system including an input, a charging circuit, an auxiliary power supply, a plurality of lights, a driver, and a controller. The input is configured to receive a line voltage. The charging circuit is configured to receive the line voltage and output a charging voltage. The auxiliary power supply is configured to receive the charging voltage. The plurality of lights include a first portion of lights and a second portion of lights. The driver is configured to provide power to the plurality of lights. The controller is configured to monitor the line voltage, compare the line voltage to a threshold, control the driver to provide power to the first portion of lights and the second portion of lights when the input voltage is above the threshold, and provide power to the second portion of lights when the input voltage is below the threshold.

In another embodiment the application provides a method of controlling a plurality of lights including a first group of lights and a second group of lights. The method includes monitoring, via a controller, a line voltage; comparing, via the controller, the line voltage to a threshold; providing, via a driver, power to the first group of lights and the second group of lights when the input voltage is above the threshold; and providing power to the second group of lights when the input voltage is below the threshold.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1A:
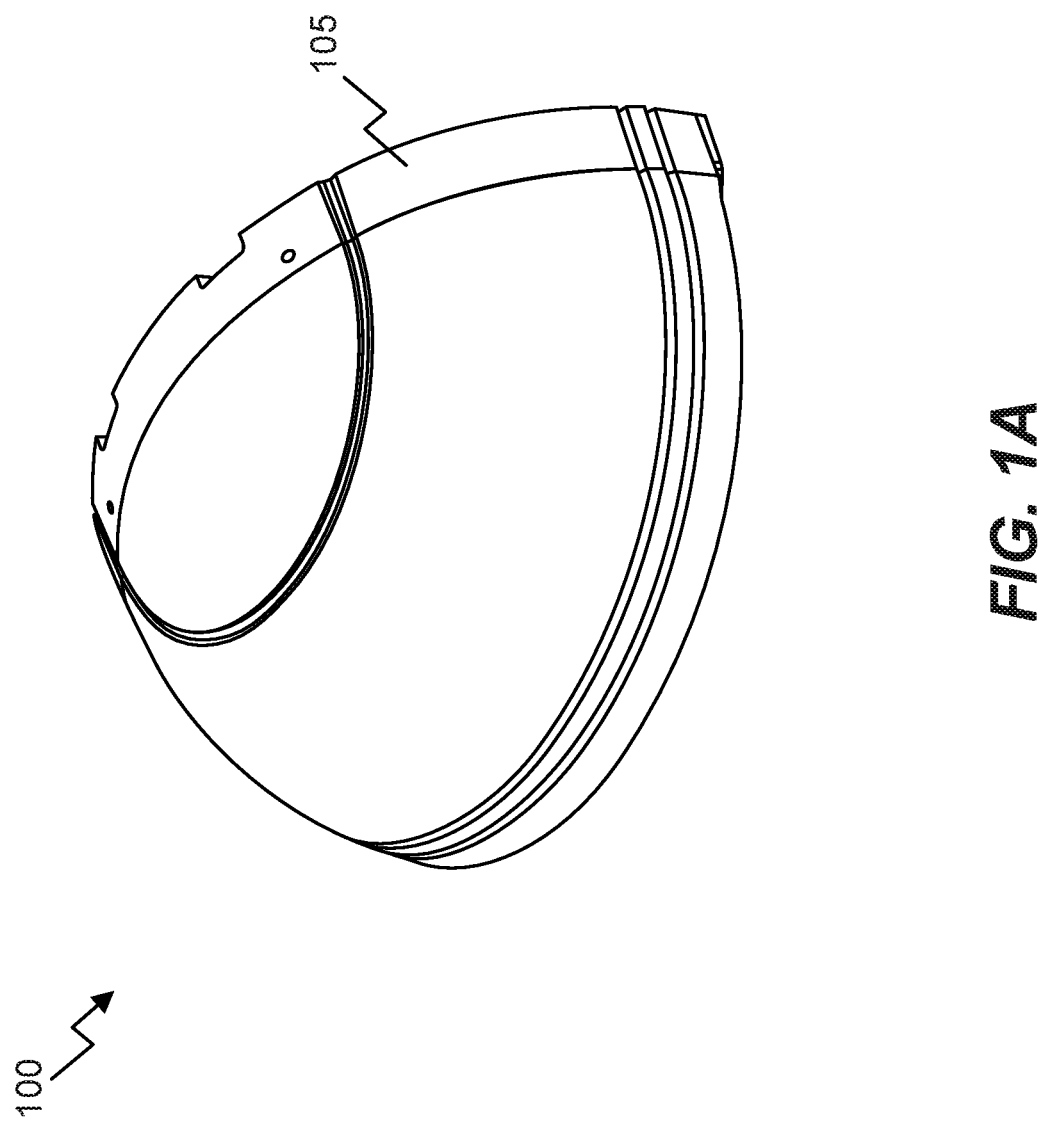
FIGS. 1A and 1B illustrate an emergency lighting system according to one embodiment of the present application.
Figure 1B:
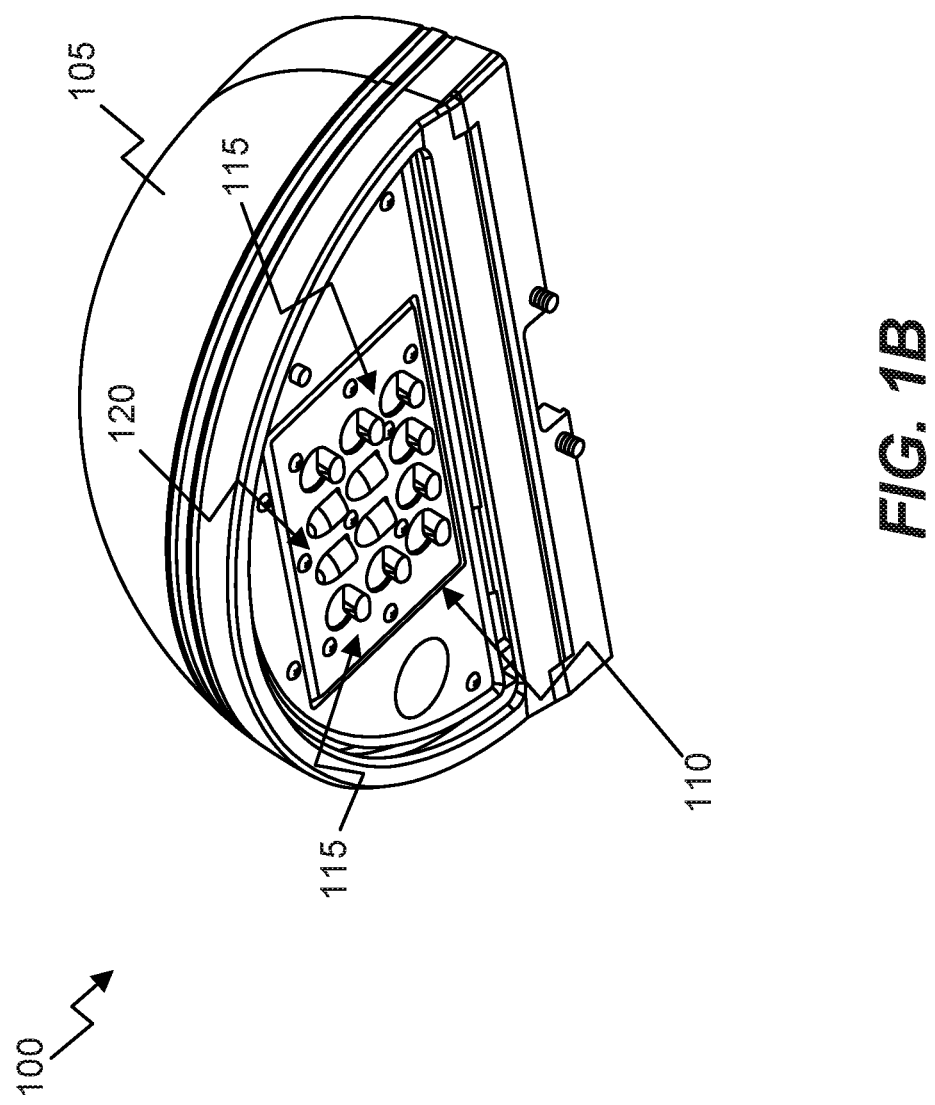

FIGS. 1A and 1B illustrate an emergency lighting unit, or system, 100 according to one embodiment of the application. The system 100 includes a housing 105 made from, for example, flame-rated UV stable thermoplastic material. The system 100 further includes a plurality of lights 110. In some embodiments, the plurality of lights 110 include one or more light-emitting diodes (LEDs). In other embodiments, the plurality of lights 110 include one or more incandescent or fluorescent light sources. In some embodiments, the plurality of lights include a first light group 115 and a second light group 120. In such an embodiment, the first light group 115 may be positioned to direct light in a first direction and the second light group 120 may be positioned to direct light in a second direction. In some embodiments, the first direction and the second direction may be the same.

Figure 2:
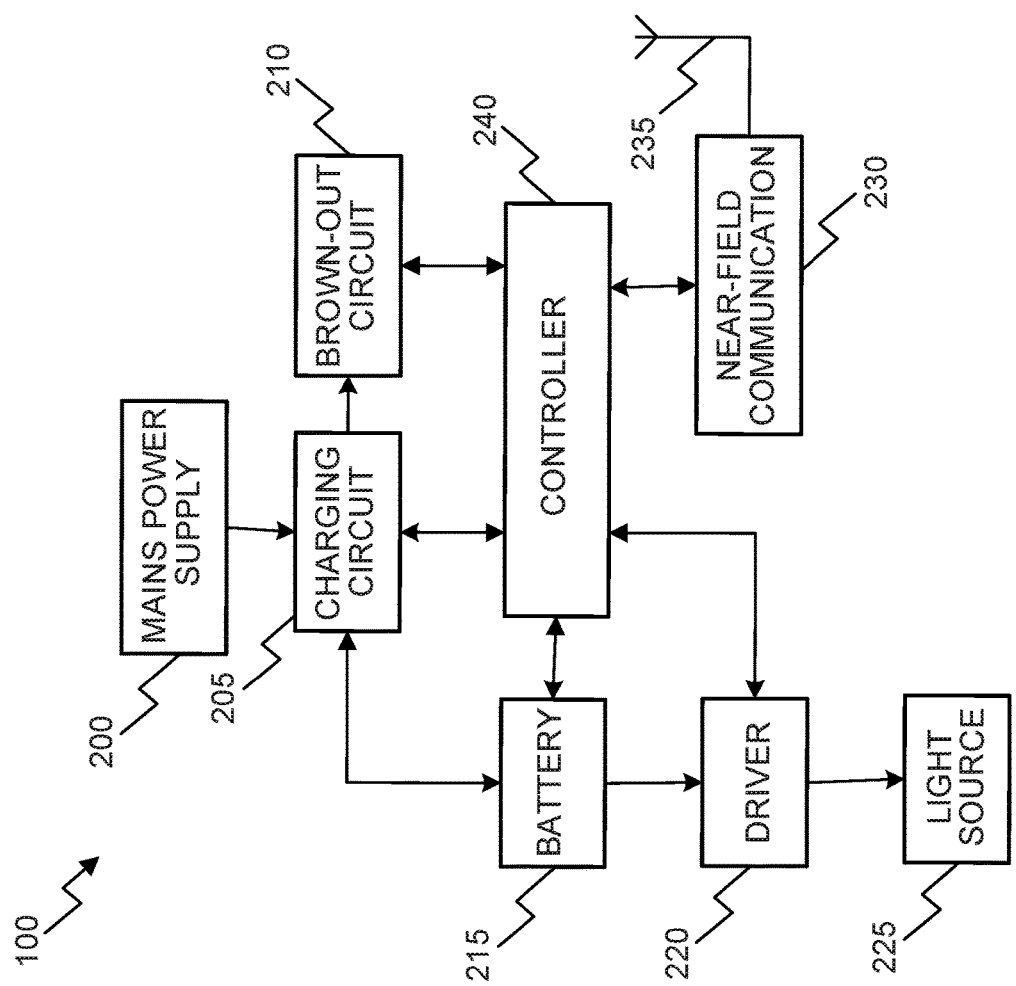
FIG. 2 illustrates a block diagram of the emergency lighting system of FIGS. 1A and 1B according to some embodiments of the present application.

FIG. 2 illustrates a block diagram of the emergency lighting system 100. The system 100 includes a mains power supply module 200, a charging circuit module 205, a brown-out circuit module 210, a battery module 215, a driver (e.g., LED driver) module 220, a light source module (e.g., LEDs, lamps, etc.) 225, an NFC module 230, an antenna 235, and a controller 240. The modular schematic illustrated in FIG. 3 has been simplified for illustrative purposes and additional connections among or between various modules within the emergency lighting unit 100 can be present beyond those illustrated in FIG. 3. For example, the mains power supply module 200 can provide power directly to each of the modules within the emergency lighting unit 100, rather than through one or more modules of the emergency lighting unit 100.

The mains power supply module 200 receives power from a line voltage (e.g., an AC mains power supply) that provides, for example, an AC voltage of between approximately 100 VAC and 305 VAC (e.g., between 120 VAC and 277 VAC). The mains power supply module 200 is operable to rectify the AC input voltage and generate a DC output voltage that can be used to power the emergency lighting unit 100. In some embodiments, the mains power supply module 200 is implemented using a flyback topology that incorporates a flyback transformer, as described below. The charging circuit module 205 receives power from the mains power supply module 200 and provides charging current to the battery module 215. The brown-out circuit module 210 is connected to mains power supply module 200 through the charging circuit module 205 and extracts input voltage information related to the voltage level of the mains power supply. The battery module 215 includes one or more batteries and provides auxiliary power to the light source module 225 when mains power is unavailable (e.g., the unit is in an emergency or brown-out condition). In some embodiments, the batteries or battery cells have a lithium-based chemistry (e.g., lithium iron phosphate ["LiFePO4"]). The voltage of the batteries in the battery module 215 can also be monitored by the controller 240 to determine when the batteries need to be charged by the charging circuit module 205. The driver module 220 generates drive signals for the light source module 225. For example, the driver module 220 generates drive signals for the plurality of lights 110 of the light source module 225 based on specified or determined levels for the output currents provided to the plurality of lights 110, a dimming level, fade-in times, fade-out times, etc. The NFC module 230 includes a connection to the antenna 235, a connection to the controller 240, and a memory for storing operational and control parameters for the emergency lighting unit 100. In some embodiments, the NFC module 230 can include an NFC transceiver. The antenna 235 is, for example, etched onto a PCB and is operable to receive NFC signals within the 13.56 MHz ISM frequency band. In some embodiments, an inductor can be used in place of the antenna 235.

Figure 3:
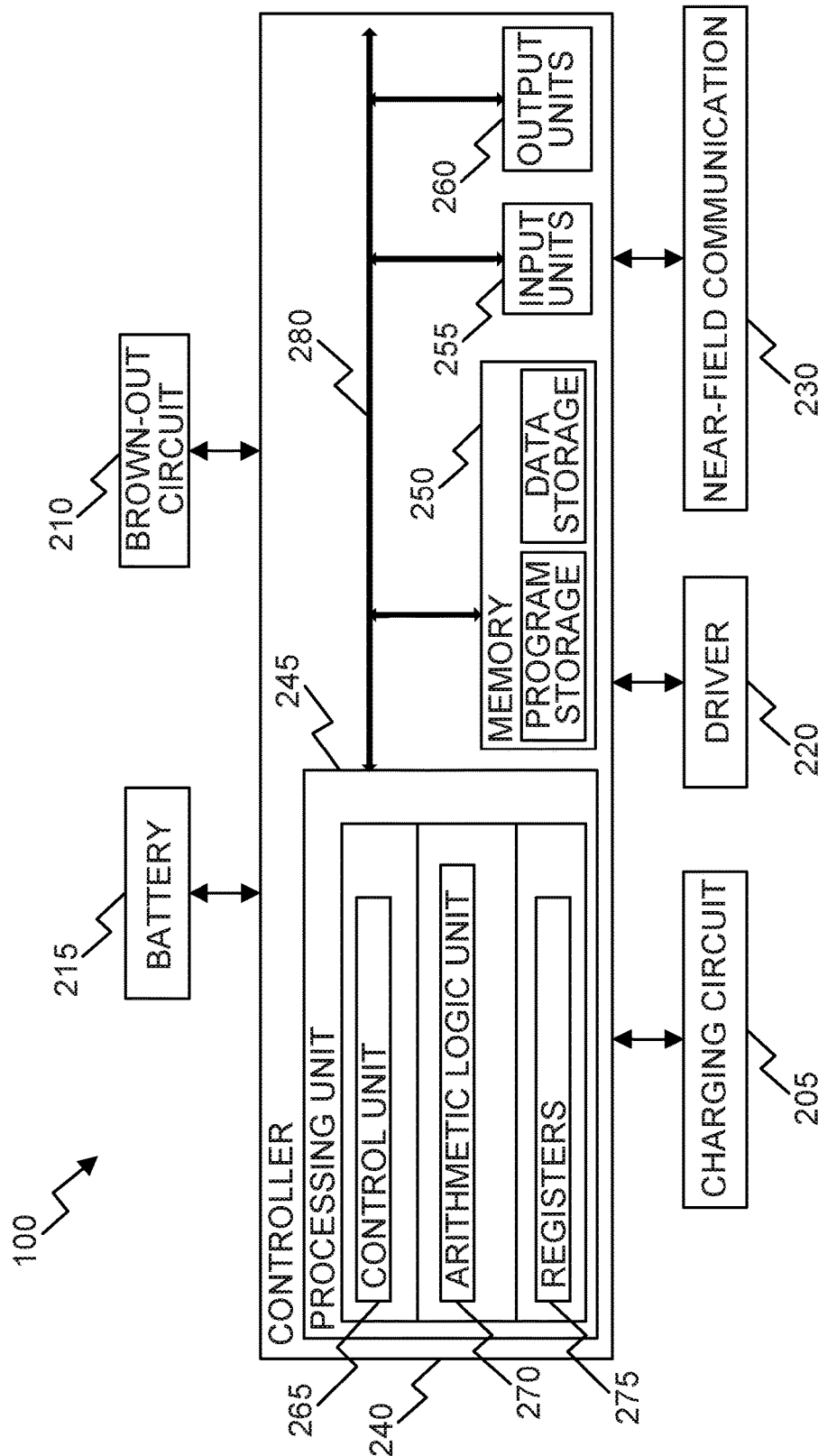
FIG. 3 illustrates a block diagram of a control system of the emergency lighting system of FIGS. 1A and 1B according to some embodiments of the present application.

FIG. 3 illustrates the controller 240 of the emergency lighting system 100 in more detail. The controller 240 is electrically and/or communicatively connected to a variety of modules or components of the emergency lighting unit 100. For example, the illustrated controller 240 is connected to the charging circuit module 205, the brown-out circuit module 210, the battery module 215, the driver module 220, and the NFC module 230. The controller 240 includes combinations of hardware and software that are operable to, among other things, control the charging state of the charging circuit module 205, identify a brown-out or brown-in condition, monitor the voltage of the battery module 215, control a drive level of driver module 220, receive operational and control system parameters from the NFC module, etc.

In some embodiments, the controller 240 includes a plurality of electrical and electronic components that provide power, operational control, and protection to the components and modules within the controller 240 and/or the emergency lighting unit 100. For example, the controller 240 includes, among other things, a processing unit 245 (e.g., a microprocessor or another suitable programmable device), a memory 250, input units 255, and output units 260. The processing unit 245 includes, among other things, a control unit 265, an arithmetic logic unit ("ALU") 270, and a plurality of registers 275 (shown as a group of registers in FIG. 4), and is implemented using a known computer architecture, such as a modified Harvard architecture, a von Neumann architecture, etc. The processing unit 245, the memory 250, the input units 255, and the output units 260, as well as the various modules connected to the controller 240 are connected by one or more control and/or data buses (e.g., common bus 280). The control and/or data buses 280 are shown generally in FIG. 4 for illustrative purposes. The use of one or more control and/or data buses for the interconnection between and communication among the various modules and components would be known to a person skilled in the art in view of the invention described herein. In some embodiments, the controller 240 is a microcontroller, is implemented partially or entirely on a semiconductor chip, is a field-programmable gate array ("FPGA"), is an application specific integrated circuit ("ASIC"), etc.

The memory 250 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or structures. The processing unit 245 is connected to the memory 250 and executes software instructions that are capable of being stored in a RAM of the memory 250 (e.g., during execution), a ROM of the memory 250 (e.g., on a generally permanent basis), or another non-transitory computer readable medium such as another memory or a disc. Software included in the implementation of the emergency lighting unit 100 can be stored in the memory 250 of the controller 240. The software includes, for example, firmware, one or more applications, program data, filters, rules, one or more program modules, and other executable instructions. The controller 240 is configured to retrieve from memory 250 and execute, among other things, instructions related to the control processes, methods, and communication protocols described herein. In other constructions, the controller 240 includes additional, fewer, or different components.

Figure 4:
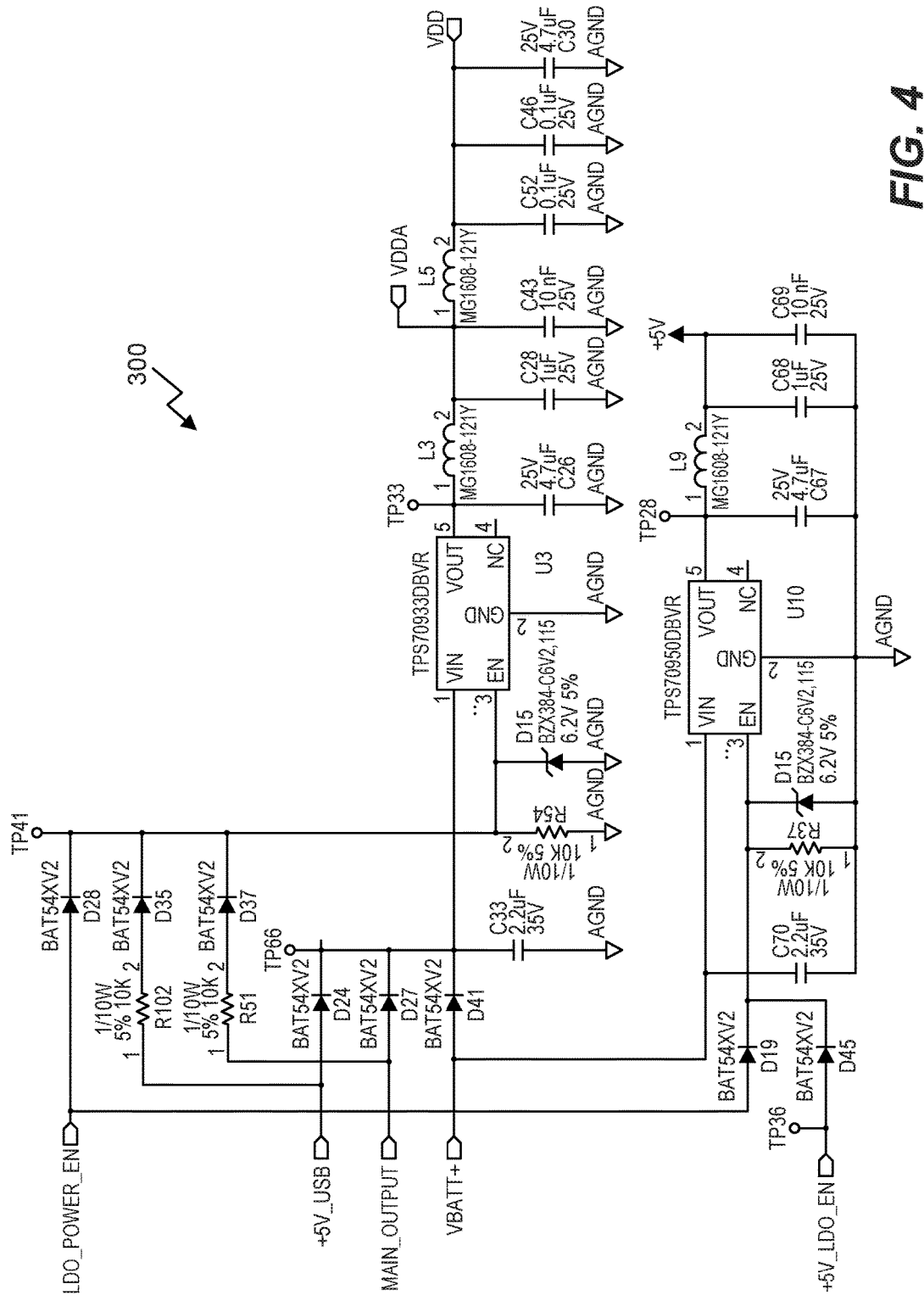
FIG. 4 illustrates a circuit diagram of an input power stage module of the emergency lighting system of FIGS. 1A and 1B according to some embodiments of the present application.
Figure 5:
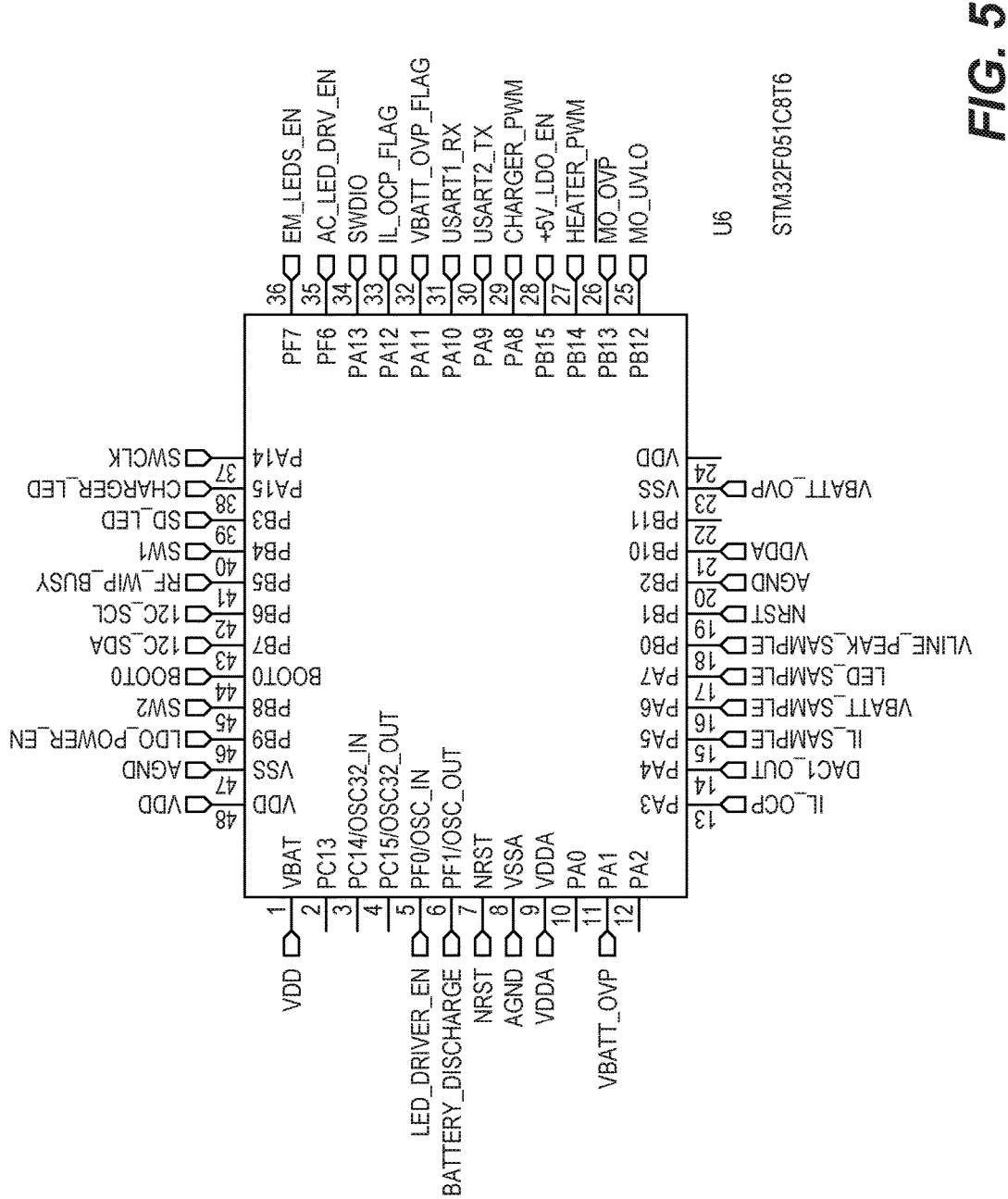
FIG. 5 illustrates a controller of the control system of FIG. 3 according to some embodiments of the present application.
Figure 6A:
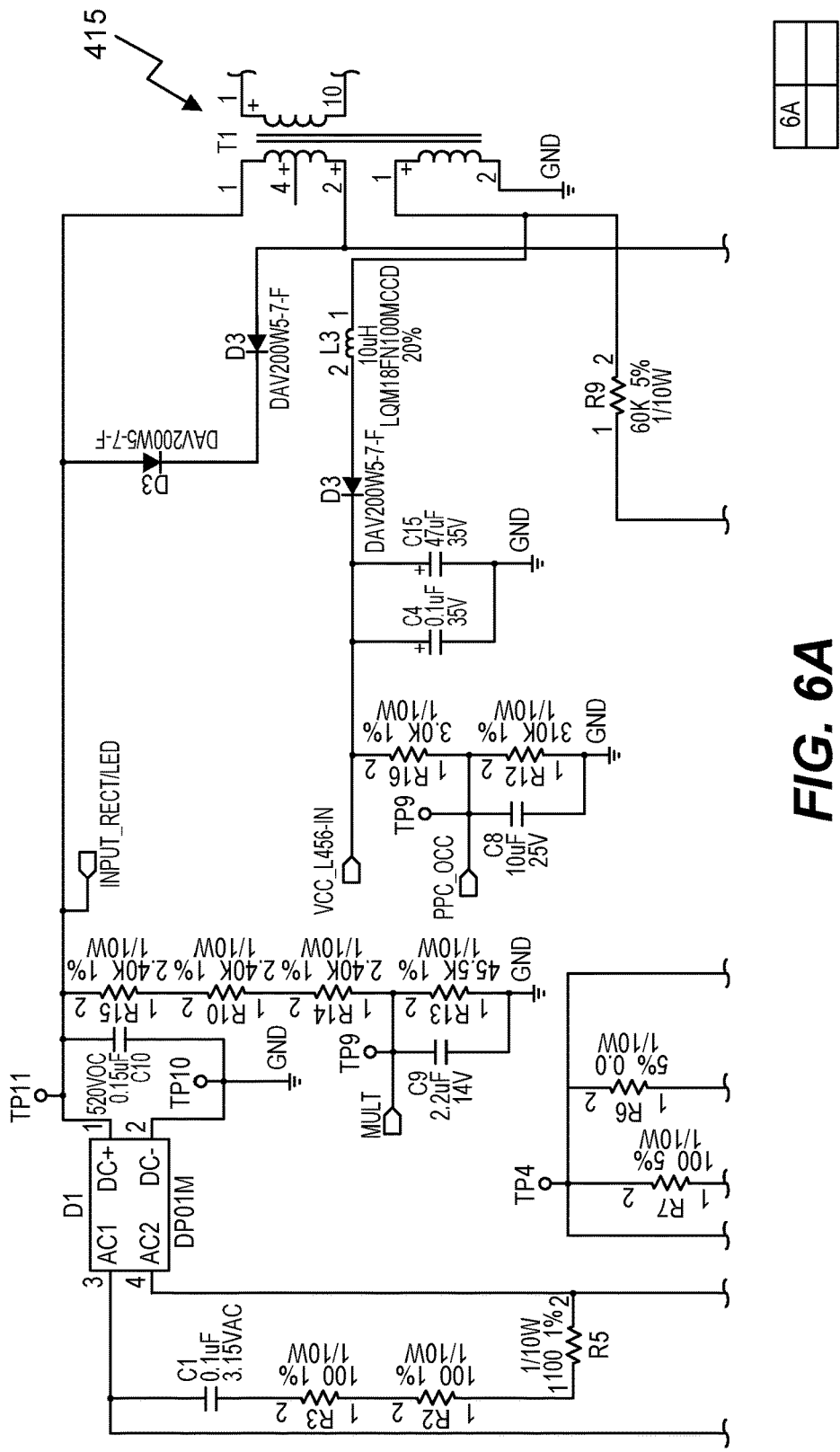
FIGS. 6A-6D illustrate a circuit diagram of a mains power supply and a brown-out circuit module of the emergency lighting system of FIGS. 1A and 1B according to some embodiments of the present application.
Figure 6B:
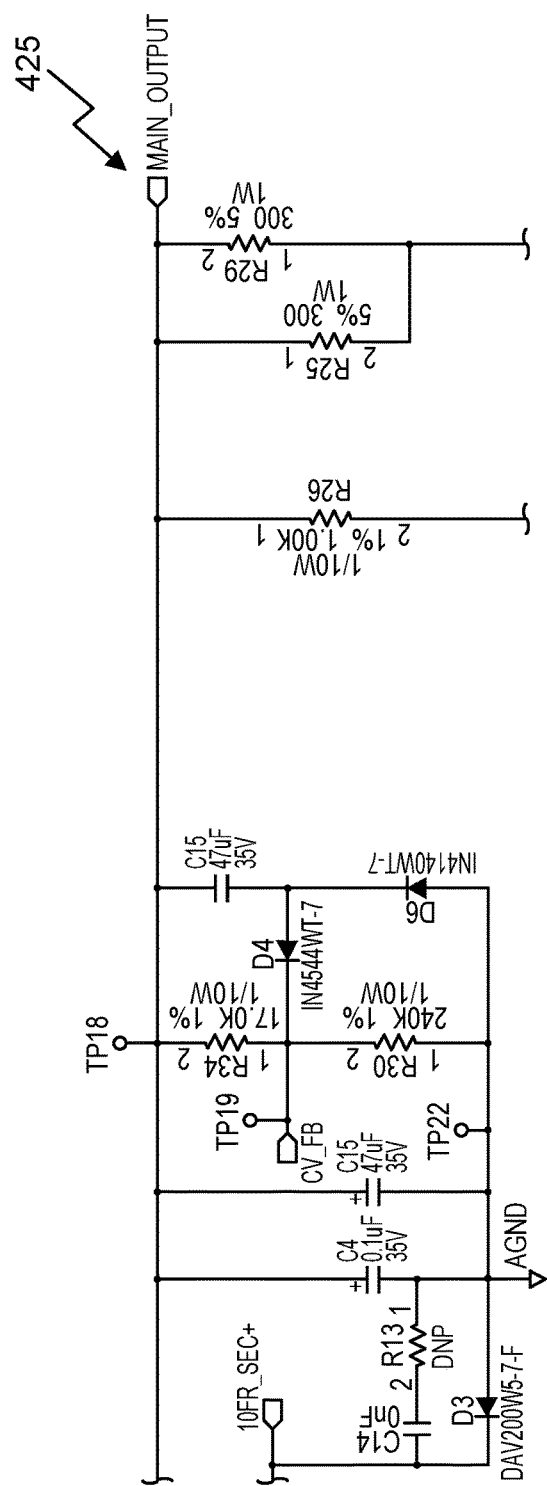
Figure 6C:
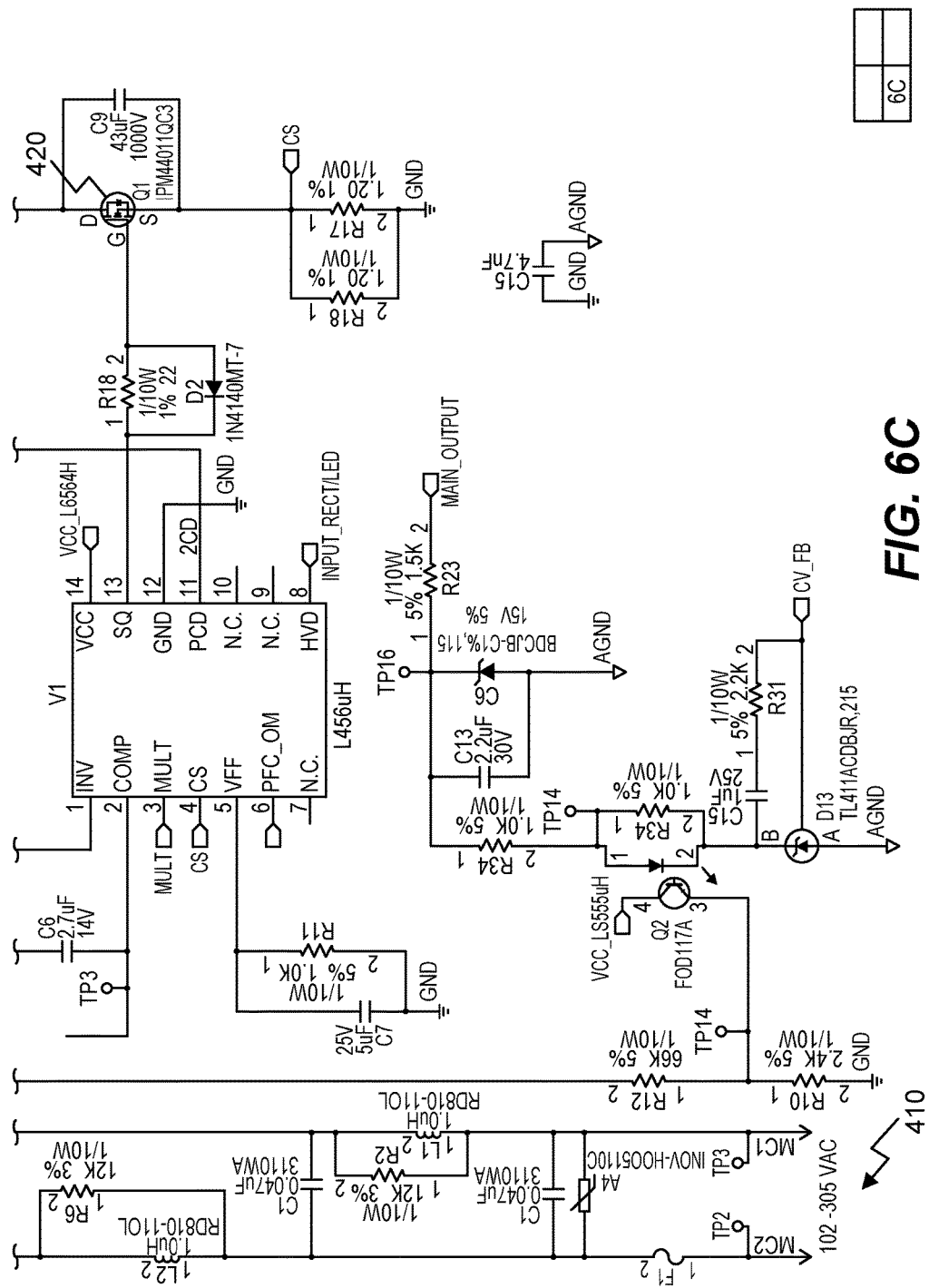
Figure 6D:
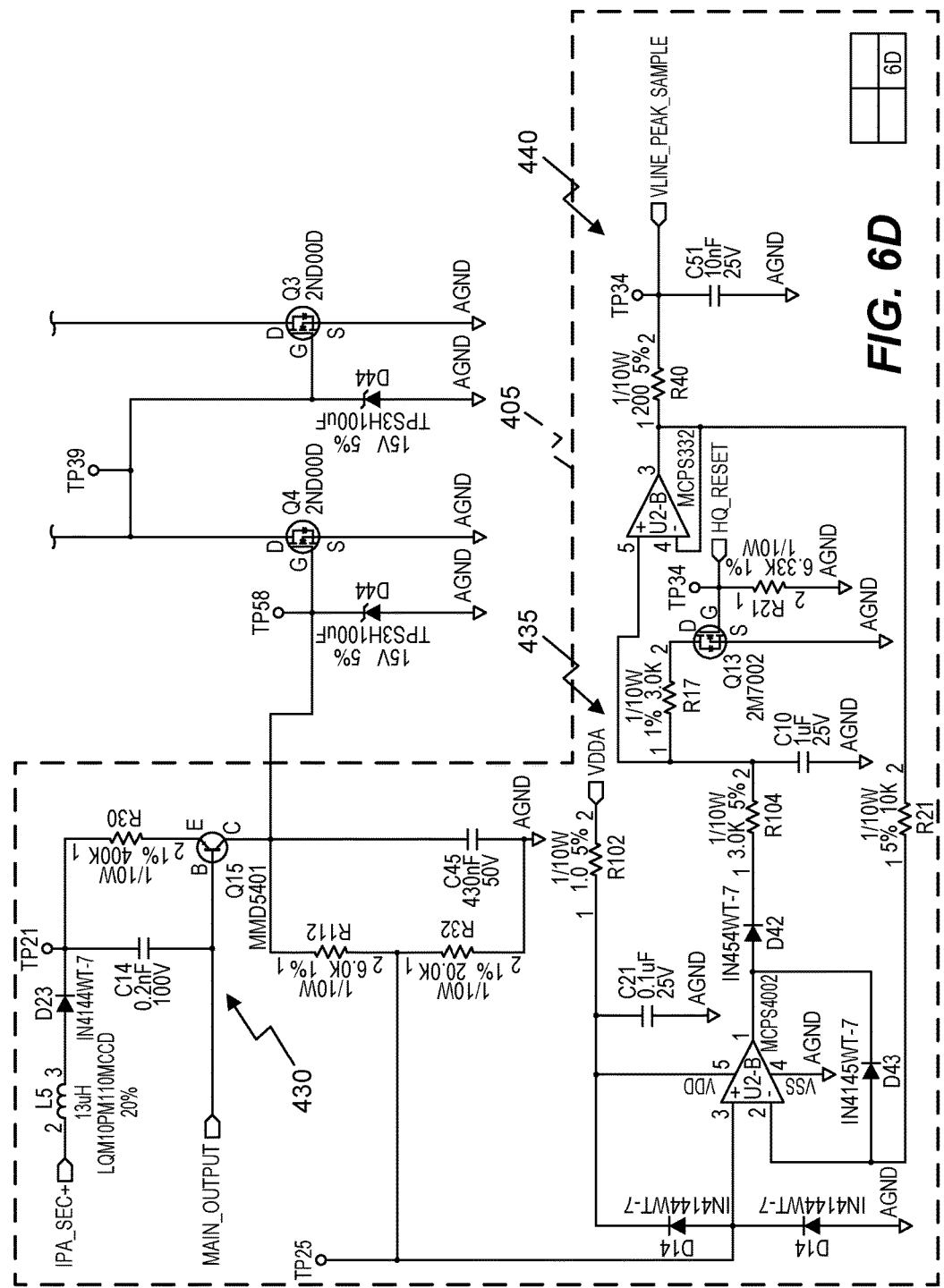

FIG. 4 illustrates an input power stage circuit module 300 for a controller 240 of the emergency lighting system 100 according to one embodiment of the application. The input power stage circuit module 300 regulates an input DC voltage to provide a stable DC output voltage (e.g., approximately 3V to approximately 5V) to the controller 240. The output voltage VDD, of the input power stage circuit module 300, is provided as an input voltage to the controller 240 as illustrated in FIG. 5. In some embodiments, the controller 240 is substantially similar to the controller 240 described with respect to FIG. 2. In some embodiments, the controller 240 and the input power stage circuit module 300 are located on a primary or main printed-circuit board (PCB).

FIG. 6 illustrates a mains power supply circuit 400 and a brown-out circuit module 405. The mains power supply circuit 400 utilizes a simplified offline flyback circuit topology. The mains voltage ranges from approximately 102 VAC to 305 VAC and is applied to inputs 410. The AC input voltage is rectified and filtered before being provided to a transformer, or flyback transformer, 415. The transformer 415 includes a primary coil, a secondary coil, and a switch 420. In some embodiments, the switch 420 is a transistor (e.g., a FET, a MOSFET, a JFET, a BJT, or similar transistor).

In a typical flyback topology converter, the transformer 415 is not used as a traditional transformer to transmit energy from the primary side to the secondary side in real time. Instead, the transformer 415 is used to store energy. The mains power supply output 425, MAIN_OUTPUT, is used to power various portions of the emergency lighting unit 100.

The brown-out module 405 is operable to determine if the mains voltage drops below a threshold value, or recovers to exceed the threshold value. In some embodiments, the threshold value is approximately 80% to approximately 90% the mains voltage. For example, when the mains voltage is approximately 110 VAC, the threshold may be within a range of approximately 88 VAC to approximately 99 VAC. In another example, when the mains voltage is approximately 220 VAC, the threshold may be within a range of approximately 176 VAC to approximately 198 VAC. In some embodiments, the brown-out module 405 takes advantage of the flyback topology of the power supply and extracts input voltage information using the existing flyback power stage components. The brown-out module 405 scales the voltage down to a DC voltage that is proportional to the mains voltage level. The DC voltage can then be sampled by the controller 240 to monitor the real-time mains voltage and detect brown-out events. The brown-out module 405 is connected across the secondary coil of the transformer 415. The brown-out module 405 includes a level shifter 430 that is followed by a peak detector 435. The peak detector output 440, VLINE_PEAK_SAMPLE, is provided to the controller 240 to monitor for the occurrence of a brown-out or brown-in condition.

Figure 7:
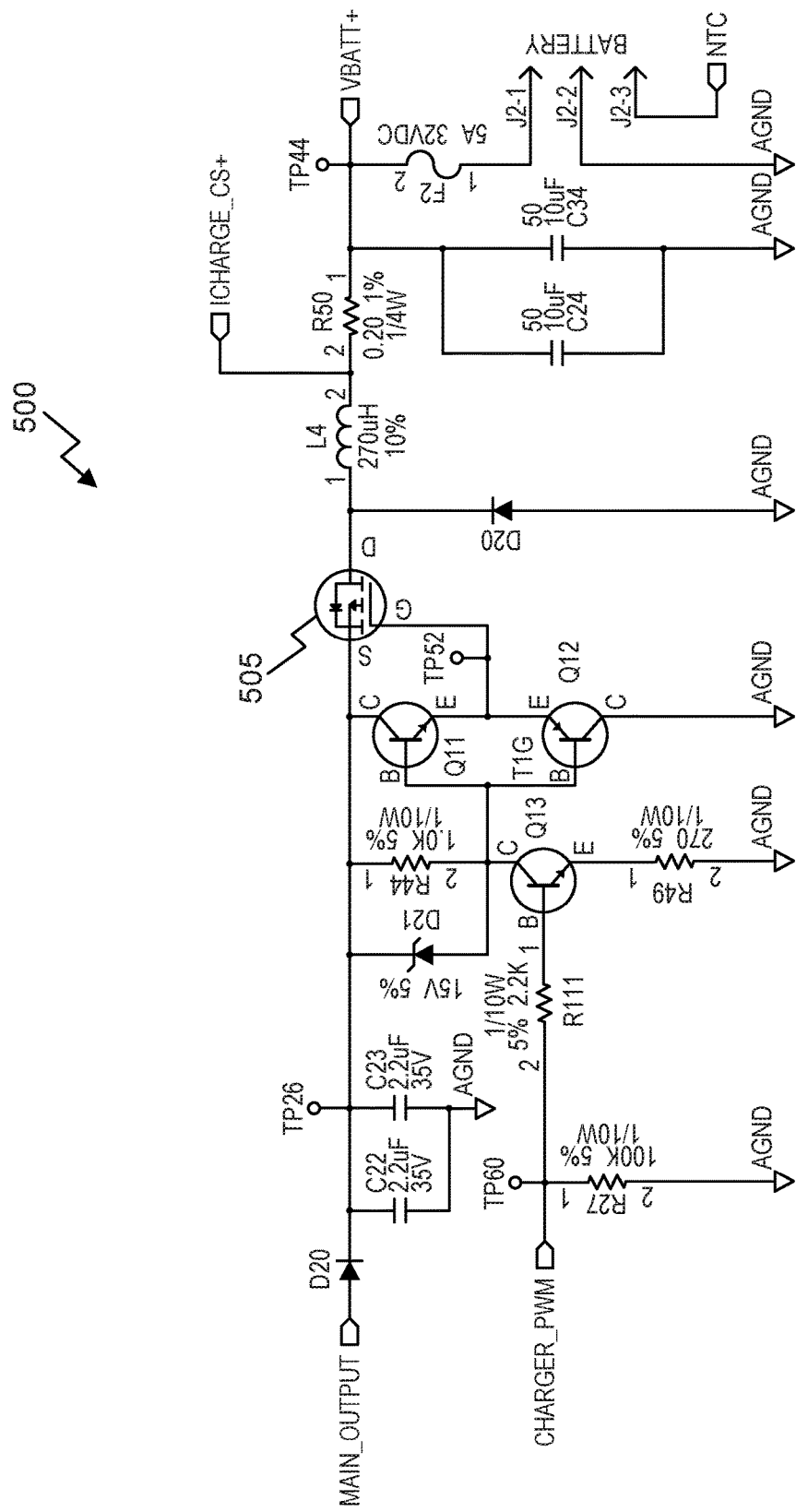
FIG. 7 illustrates a circuit diagram of a battery charger power stage module of the emergency lighting system of FIGS. 1A and 1B according to some embodiments of the present application.

FIG. 7 illustrates a battery charger power stage circuit module 500. The circuit module 500 receives power from the main output of the mains power supply circuit module 400 and provides charging current to the positive terminal, VBATT+, of the battery. The circuit module 500 receives a charger PWM signal from the controller 240 The charger PWM signal is operable to control the conductive state of a charging switch 505 to produce a desired charging current.

Figure 8:
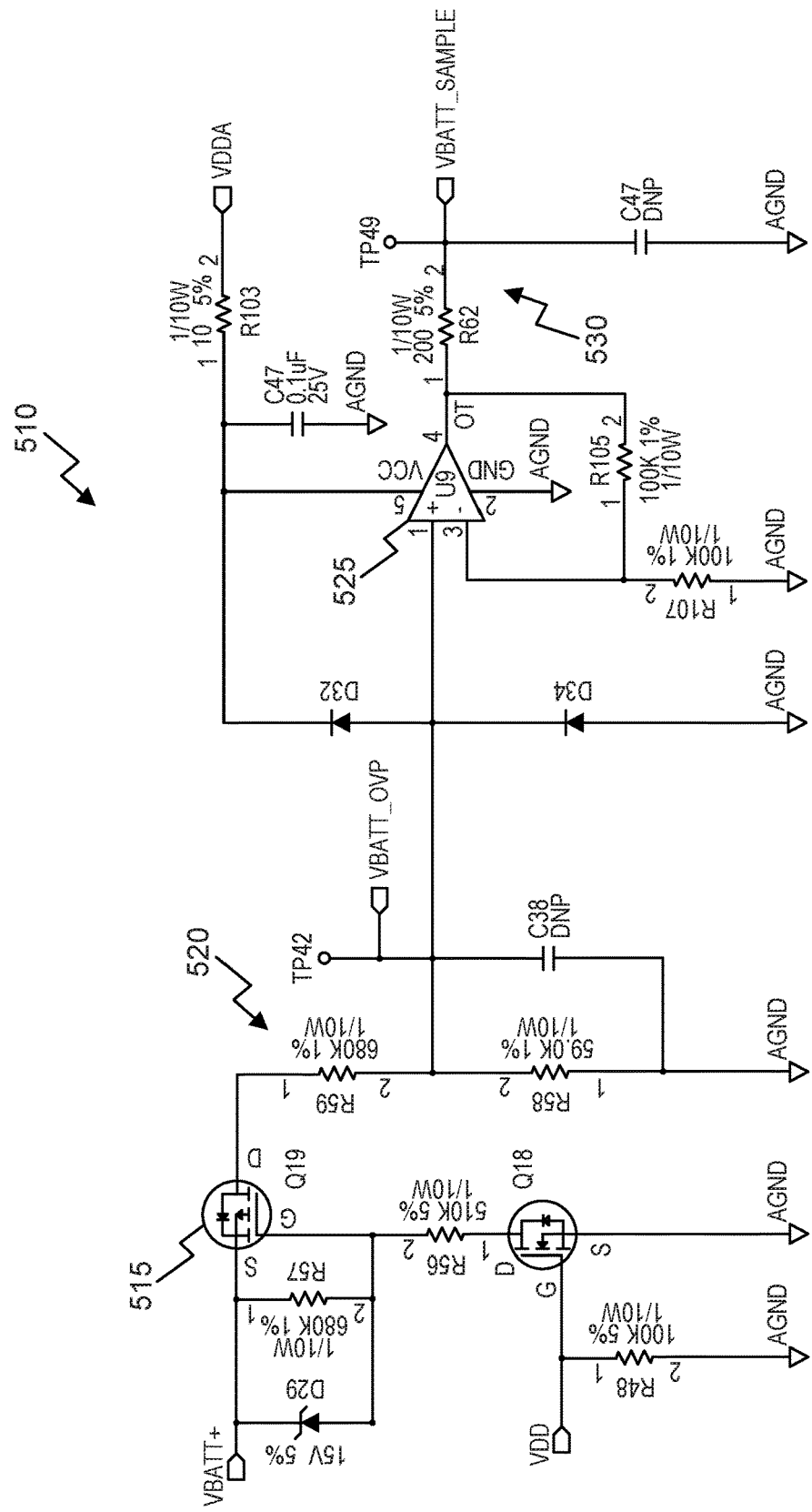
FIG. 8 illustrates a circuit diagram of a battery charger battery voltage detection module of the emergency lighting system of FIGS. 1A and 1B according to some embodiments of the present application.

FIG. 8 illustrates a battery charger battery voltage detection circuit module 510. The voltage detection circuit module 510 monitors the voltage of the positive terminal, VBATT+, of the battery. The voltage of the battery, VBATT+, is provided through a switch 515 to a voltage divider circuit 520 and a non-inverting amplifier 525. The output of the amplifier 525 is filtered by a low-pass RC filter 530 and a sampled battery voltage, VBATT_SAMPLE, is provided to the controller 240.

Figure 9:
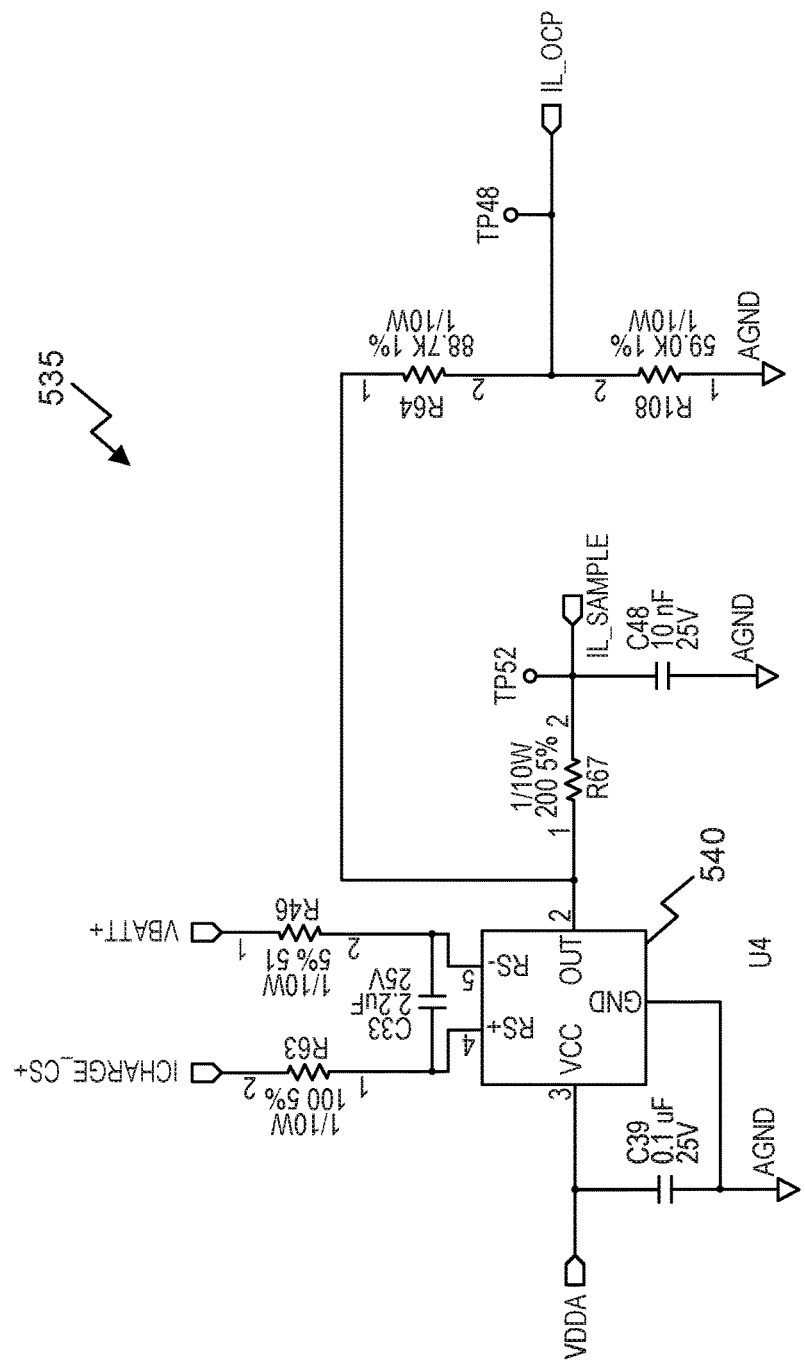
FIG. 9 illustrates a circuit diagram of a battery charger charge current sensing module of the emergency lighting system of FIGS. 1A and 1B according to some embodiments of the present application.

FIG. 9 illustrates a battery charger charge current sensing circuit module 535. The charge current sensing circuit module 535 measures a charge current that is provided to the battery. The charge current is measured across a resistor, R50 (see FIG. 7), by measuring the voltage across the resistor, R50. The voltage is provided to a current sensing integrated circuit 540, which provides a sampled current value to the controller 240.

Figure 10:
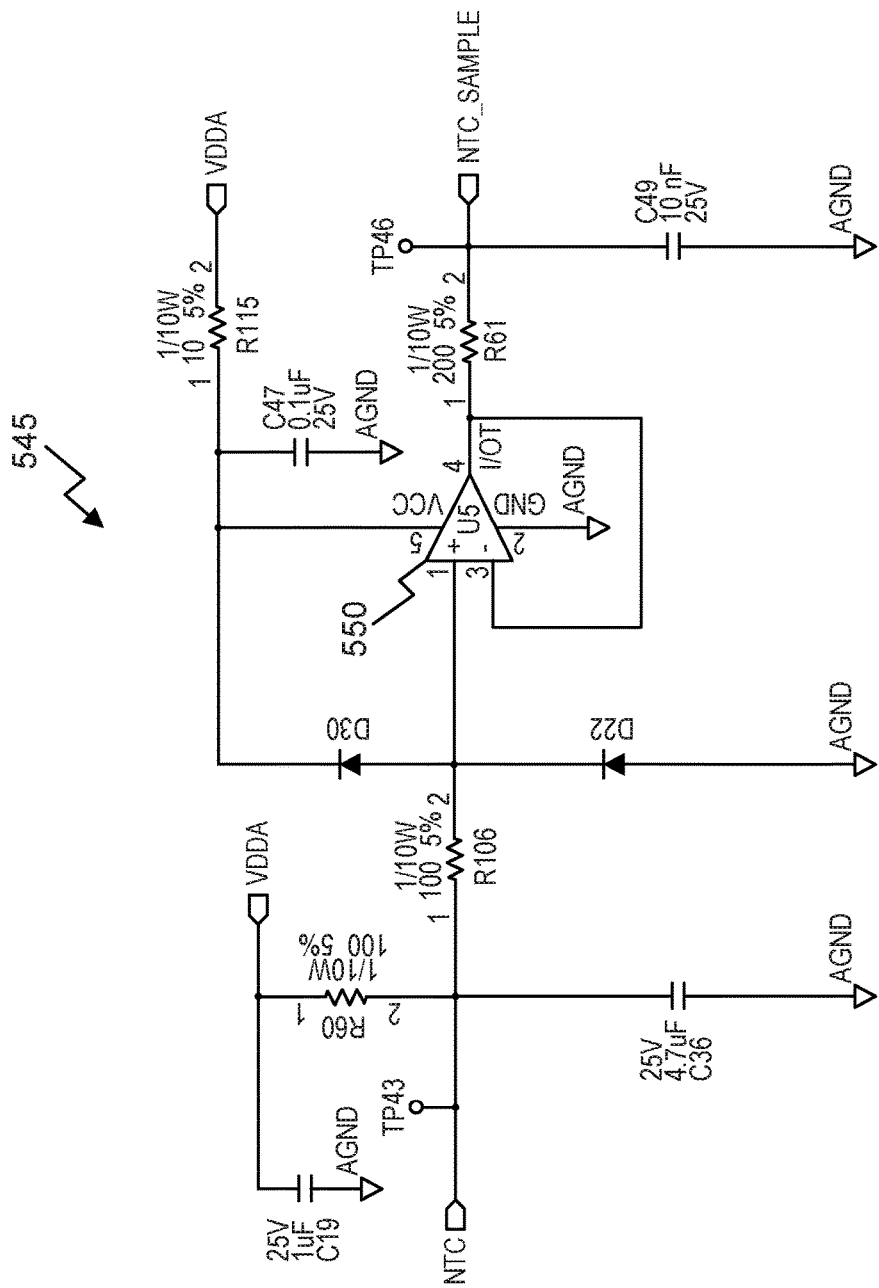
FIG. 10 illustrates a circuit diagram of a battery charger battery temperature sensing module of the emergency lighting system of FIGS. 1A and 1B according to some embodiments of the present application.

FIG. 10 illustrates a battery charger battery temperature sensing circuit module 545. The temperature sensing circuit module 545 measures the temperature of the battery to determine whether the battery is at an appropriate temperature for charging (e.g., not too cold or too hot). The temperature of the battery can be determined using a negative temperature coefficient ("NTC") resistor. The voltage of the temperature sensor is provided to a unity buffer amplifier 550, and a voltage indicative of the temperature of the battery, NTC_SAMPLE, is provided to the controller 240.

Figure 11:
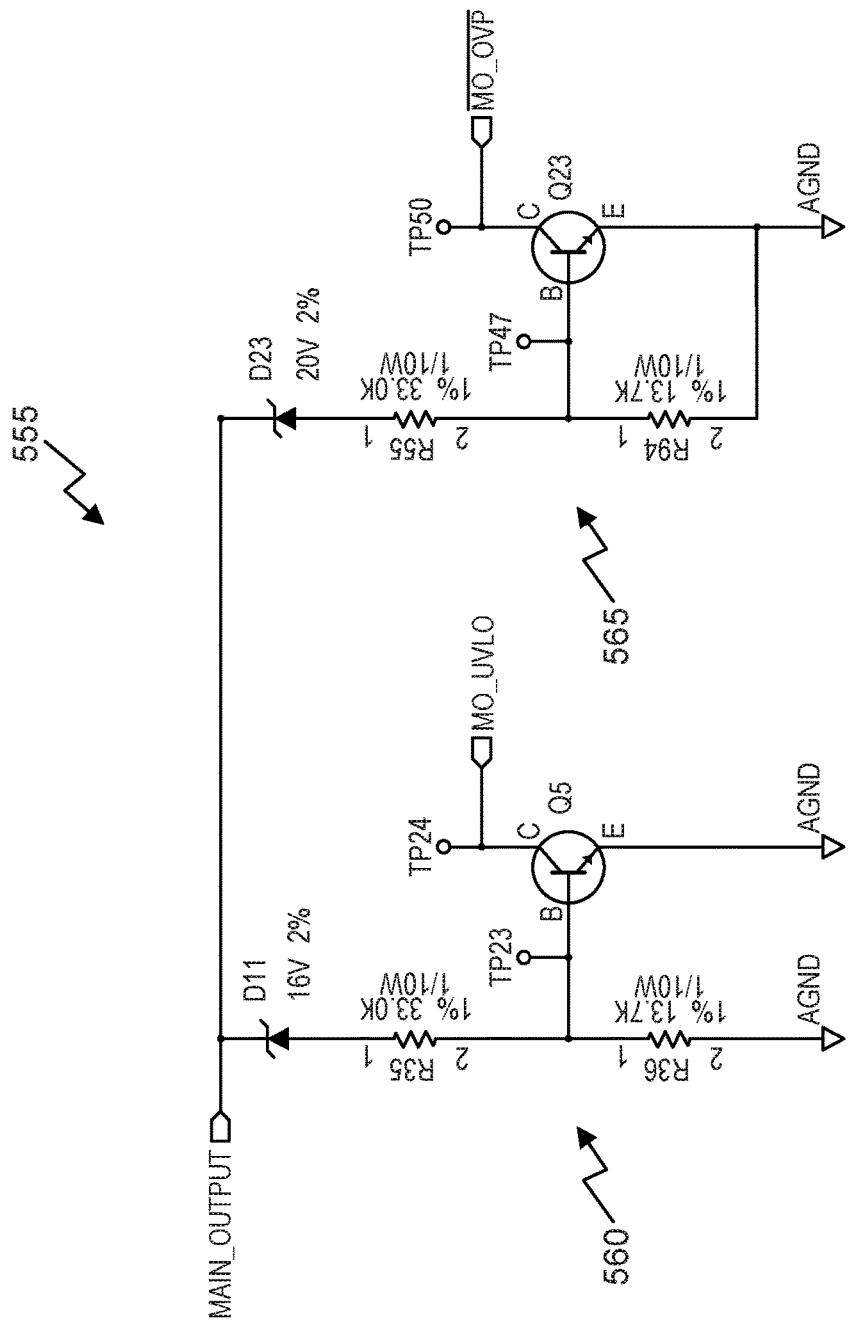
FIG. 11 illustrates a circuit diagram of a battery charger voltage qualification module of the emergency lighting system of FIGS. 1A and 1B according to some embodiments of the present application.

FIG. 11 illustrates a battery charger voltage qualification circuit module 555. The circuit module 555 receives power from the main output of the mains power supply circuit module 400. Two voltage divider circuits 560 and 565 are implemented so the controller 240 can determine whether an under-voltage condition exists (monitored by the controller as MO_UVLO) or an over-voltage condition exists (monitored by the controller as MO_OVP).

Figure 12:
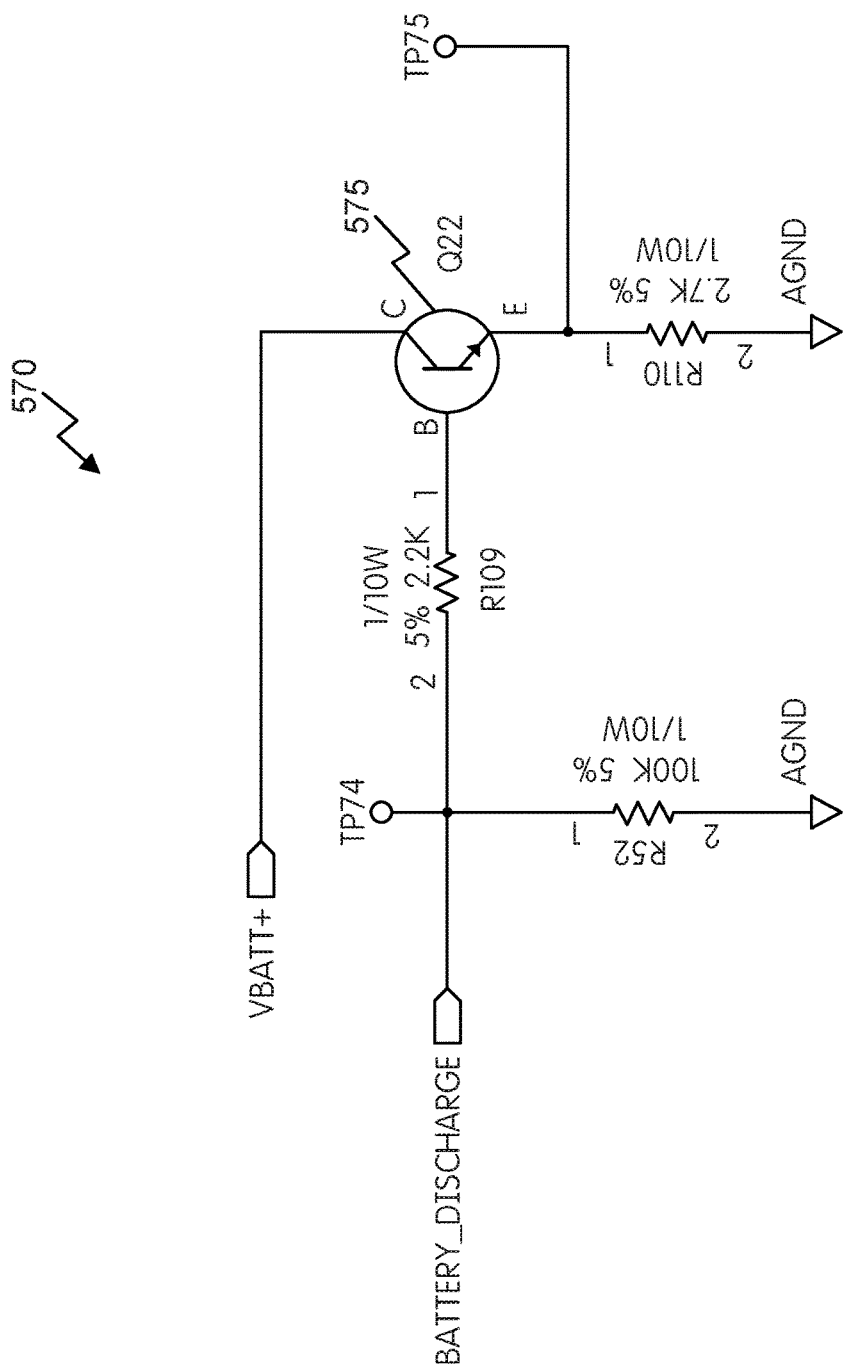
FIG. 12 illustrates a circuit diagram of a battery charger battery presence module of the emergency lighting system of FIGS. 1A and 1B according to some embodiments of the present application.

FIG. 12 illustrates a battery charge battery presence circuit module 570. The circuit module 570 is operable as a constant current sink that can be used to detect the presence of a battery in the emergency lighting unit 100. The controller 240 provides a battery discharge signal, BATTERY_DISCHARGE, to the gate of a transistor 575 to create a conductive path from the battery, VBATT+, to ground.

Figure 13:
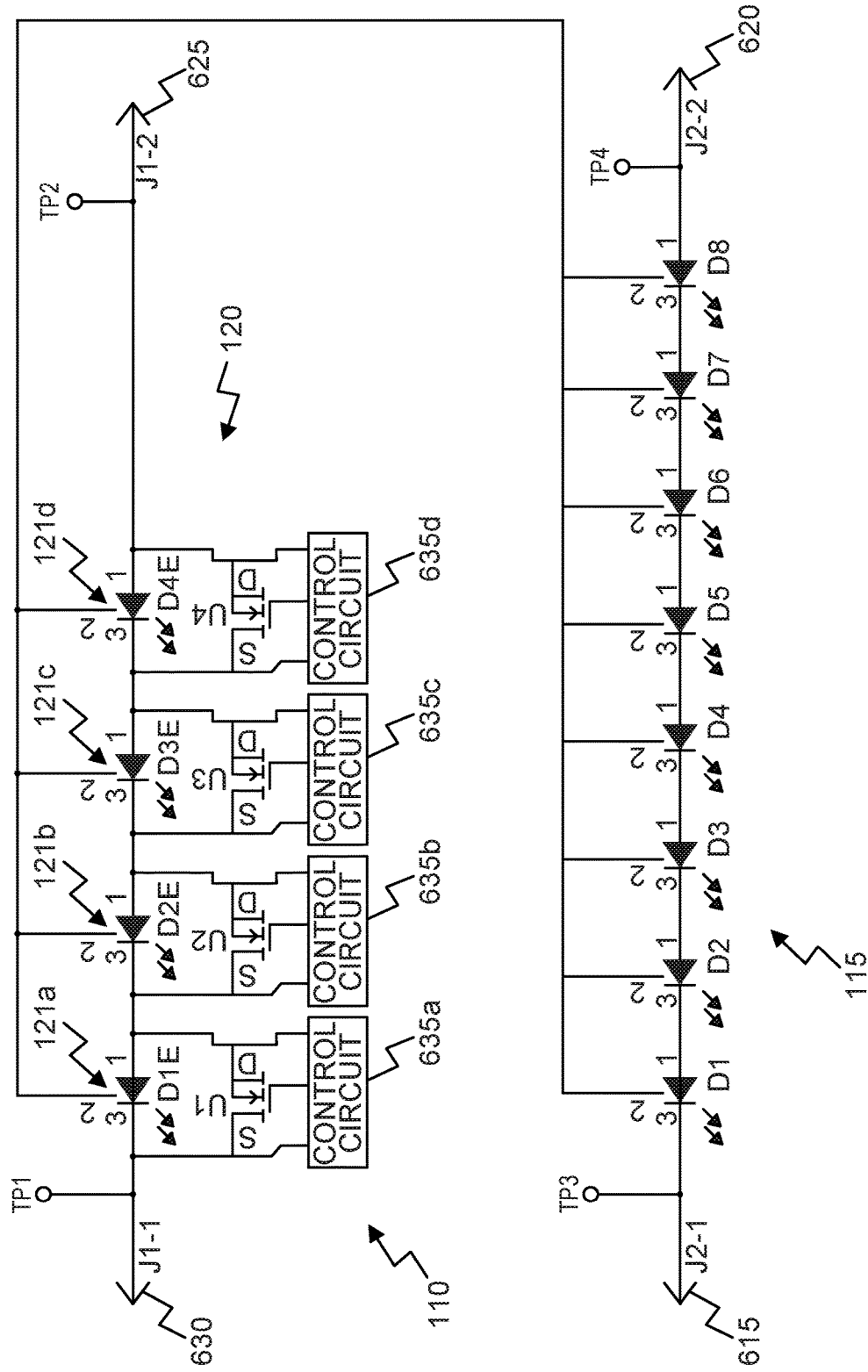
FIG. 13 illustrates a circuit diagram of a light source of the emergency lighting system of FIGS. 1A and 1B according to some embodiments of the present application.

FIG. 13 illustrates a circuit diagram of the light source 225. As discussed above, in some embodiments, the light source 225 includes the plurality of lights 110. In such an embodiment, the plurality of lights 110 include a first light group 115 and a second, or emergency, light group 120. The first light group 115 is electrically connected to a first light group input 615 and a first light group output 620. The second light group 120 is electrically connected to a second light group input 625 and a second light group output 630. In some embodiments, the second light group 120 is an emergency light group.

In some embodiments, the second light group 120 includes lights 121*a*, 121*b*, 121*c*, and 121*d*. In such an embodiment, lights 121*a*-121*d* may be LEDs. Additionally, in some embodiments, each light 121*a*-121*d* is electrically connected to a shunt control circuit 635*a*, 635*b*, 635*c*, and 635*d*, respectively. As illustrated, the shunt control circuits 635*a*-635*d* are electrically connected to an input and an output of each light 121*a*-121*d* respectively. The shunt control circuits 635*a*-635*d* are configured to provide an alternate current path in case any of the lights 121*a*-121*d* fail. Thus, during a failure of an individual light, the remaining lights of the second light group 120 may continue to operate.

Figure 14A:
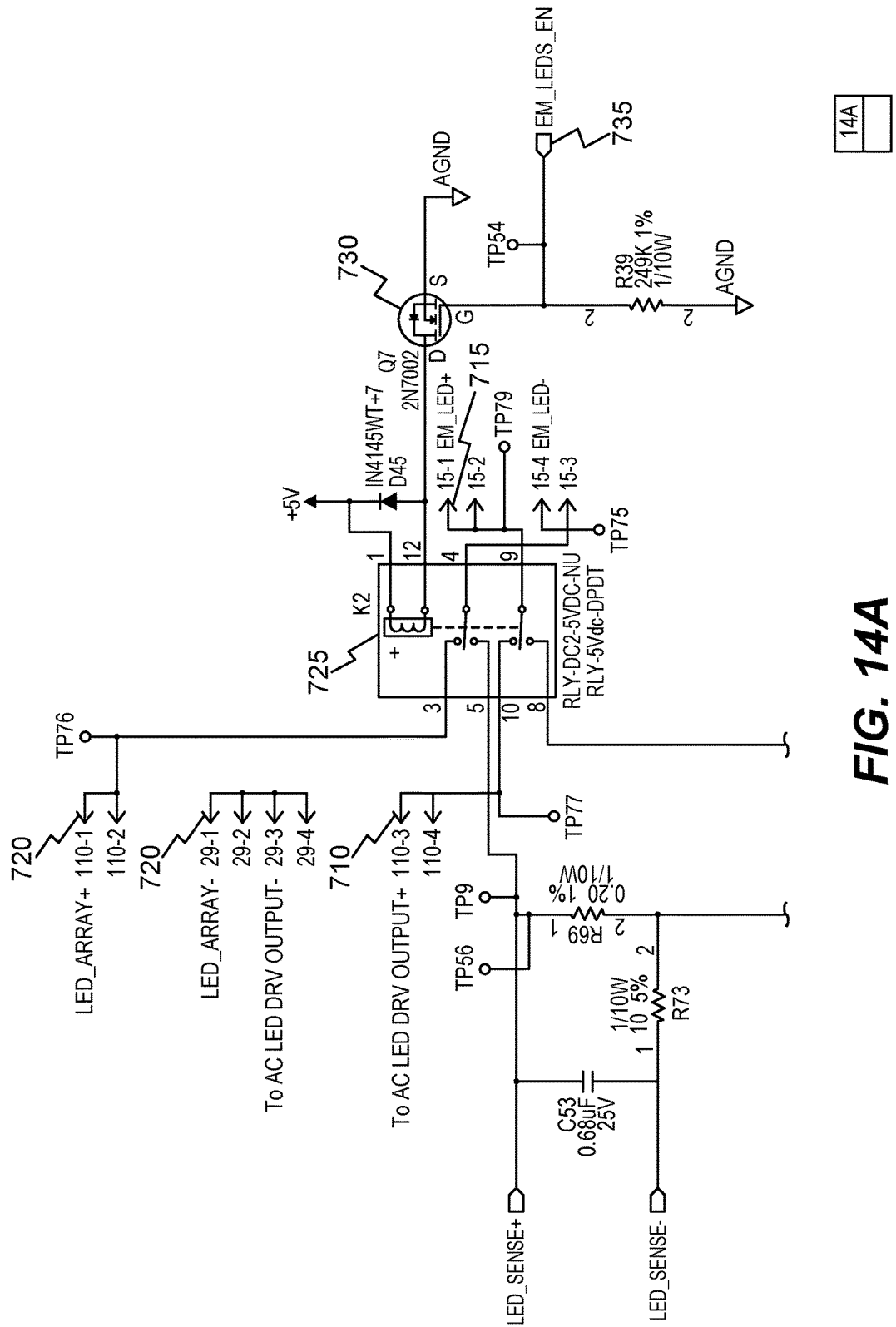
FIGS. 14A and 14B illustrate a circuit diagram of a light switching module of the emergency lighting system of FIGS. 1A and 1B according to some embodiments of the present application.
Figure 14B:
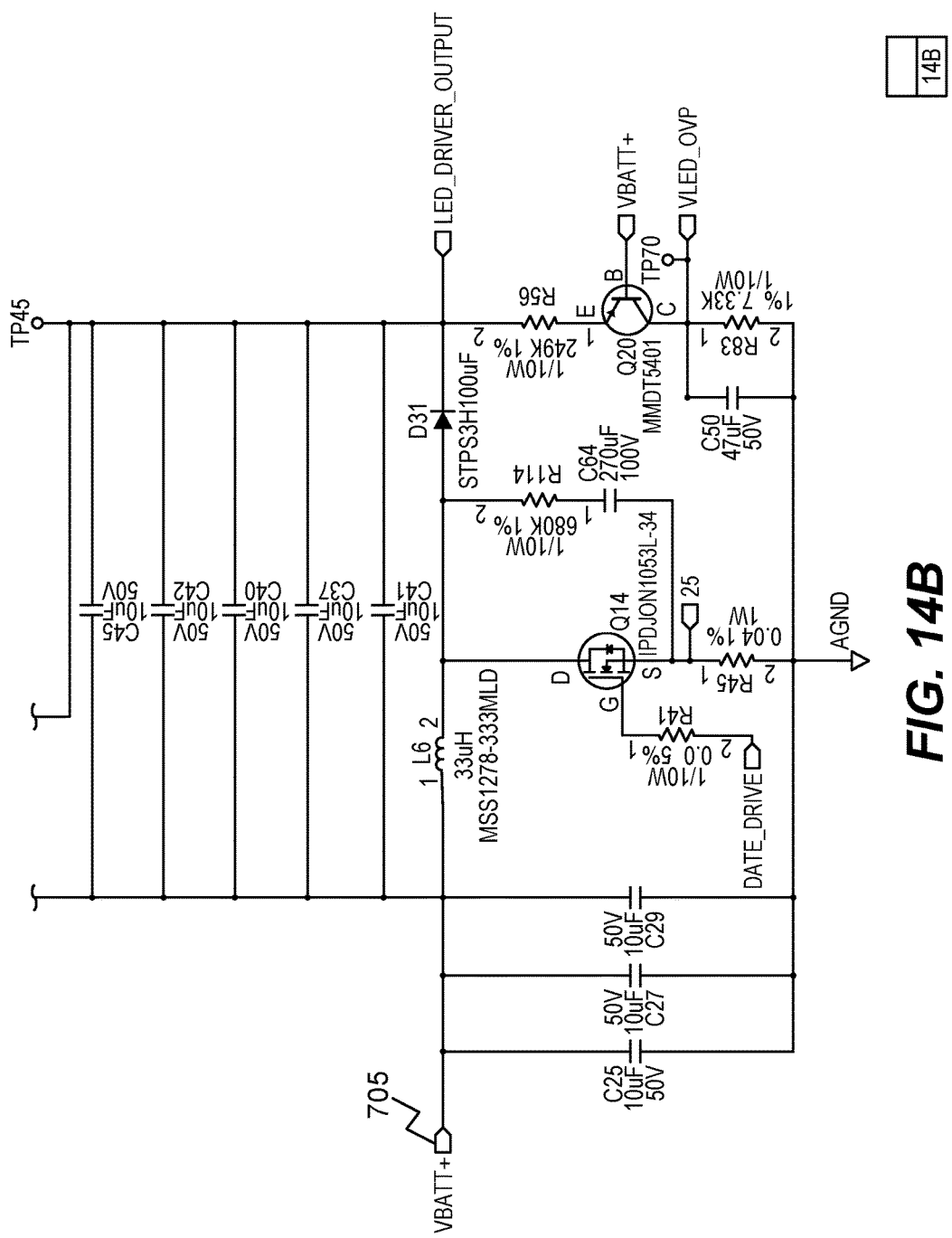

FIG. 14 illustrates a light switching circuit module 700. The light switching circuit module 700 is configured to selectively provide power to the plurality of lights 110. In some embodiments, the light switching circuit module 700 selectively provides power to either, both the first light group 115 (FIG. 13) and the second light group 120 (FIG. 13), or only the second light group 120 (FIG. 13). In another embodiments, the light switching circuit module 700 may selectively provide power to one of the first light group 115 (FIG. 13) or the second light group 120 (FIG. 13). The light switching circuit module 700 includes a battery input 705 (VBATT+), an LED driver input 710 (AC LED DRV OUTPUT+), an emergency LED output 715 (EM_LED+), an LED output 720 (LED_ARRAY+), an LED input (LED_ARRAY−) 722, a relay 725, a switch 730, and an emergency control input 735.

The battery input 705 is configured to receive power from the battery 215. In some embodiments, the battery input 705 receives power from the VBATT+ output illustrated in FIG. 7. The LED driver input 710 is configured to receive power from an output of the driver 220. An activation/deactivation signal is received at the emergency control input 735. In some embodiments, the activation/deactivation signal is output from controller 240. During normal operation, an activation signal is received at the emergency control input 735. The activation signal turns the switch 730 on, thus activating relay 725. When relay 725 is activated, power received from the output of the driver 220 is used to power the first light group 115 (FIG. 13) and the second light group 120 (FIG. 13). In some embodiments, during normal operation, power is output from LED output 720 (LED_ARRAY+) to the first light group input 615 (FIG. 13), through the first light group 115 (FIG. 13), then output from first light group output 620 (FIG. 13) to the LED input (LED_ARRAY−) 722. Power is then output from emergency LED output 715 (EM_LED+) of the light switching circuit module 700 to the second light group input 625 (FIG. 13), and through the second light group 120 (FIG. 13).

During emergency mode, a deactivation signal is received at the emergency control input 735. The deactivation signal turns switch 730 off, thus deactivating relay 725. When relay 725 is deactivated power received at the battery input 705 is used to only power the second light group 120 (FIG. 13). In some embodiments, during emergency mode, power is output from the emergency LED output 715 (EM_LED+) of the light switching circuit module 700 to the second light group input 625 (FIG. 13), and through the second light group 120 (FIG. 13).

Figure 15:
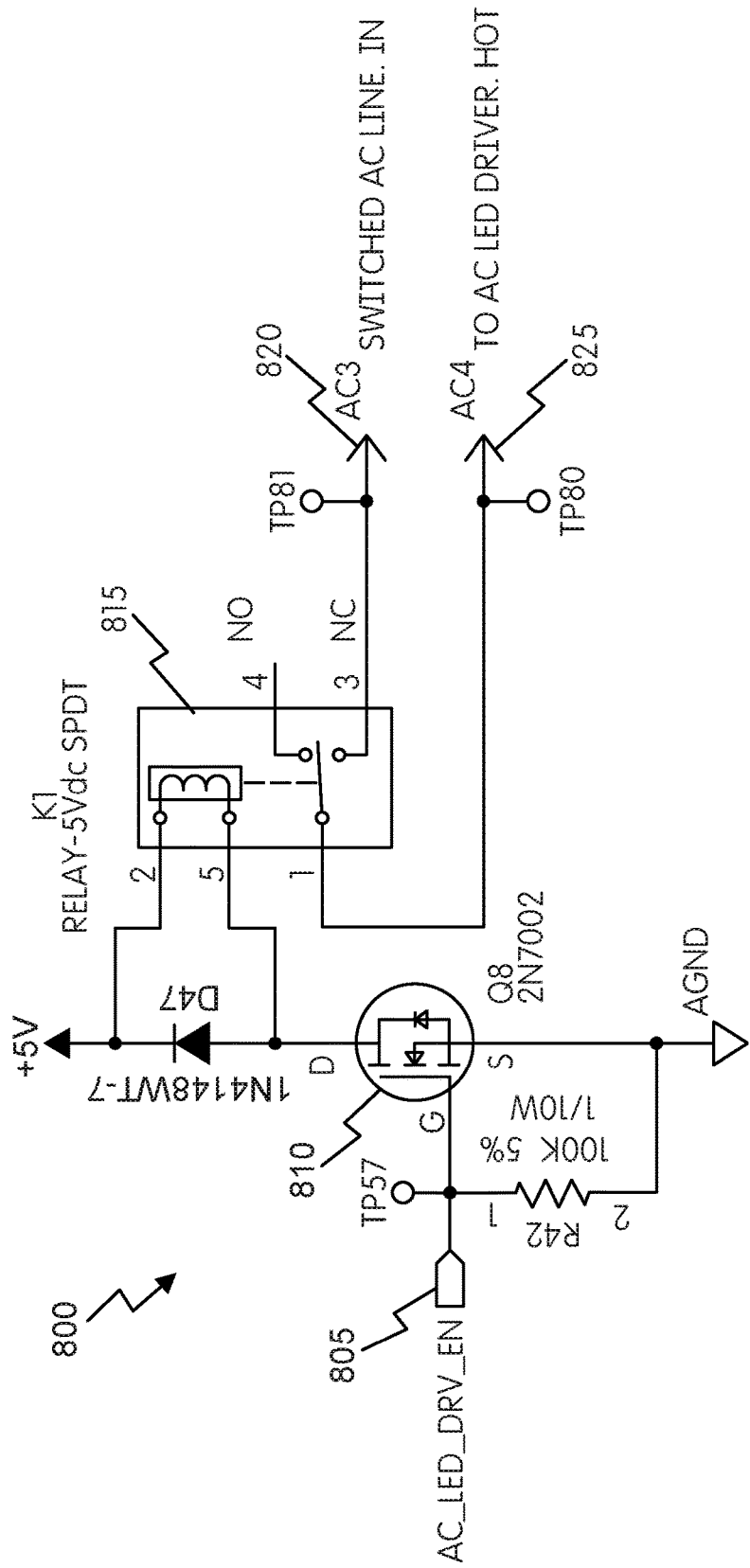
FIG. 15 illustrates a circuit diagram of a driver power switch of the emergency lighting system of FIGS. 1A and 1B according to some embodiments of the present application.

FIG. 15 illustrates a driver power switch 800. The driver power switch 800 is configured to selectively control power supplied to the driver 220. In some embodiments, the driver power switch 800 is configured to provide a relay time between the AC power (supplied by the LED driver) and the emergency power (supplied by the battery 215) being applied to the lights 110. Such a relay time may be used to ensure that the LED driver input 710 and the emergency LED output 715 are not electrically connected during transfer. Additionally, the driver power switch 800 may be configured to prevent an open circuit condition at the connection between the LED driver and the lights 110.

The driver power switch 800 includes a driver control signal input 805, a driver control switch 810, a driver control relay 815, a switched AC line input 820, and an AC LED driver output 825. During normal operation, a driver deactivation signal is received at the driver control signal input 805. When the driver deactivation signal is received, the driver control switch 810 is turned off, thus deactivating the driver control relay 815. When the driver control relay 815 is deactivated, power is provided from the switched AC line input 820, through the AC LED driver output 825, to the driver 220. During emergency mode, a driver activation signal is received at the driver control signal input 805. When the driver activation signal is received, the driver control switch 810 is turned on, thus activating the driver control relay 815. When the driver control relay 815 is deactivated, power to the driver 220 is prohibited by opening the contacts of the driver control relay 815.

Figure 16:
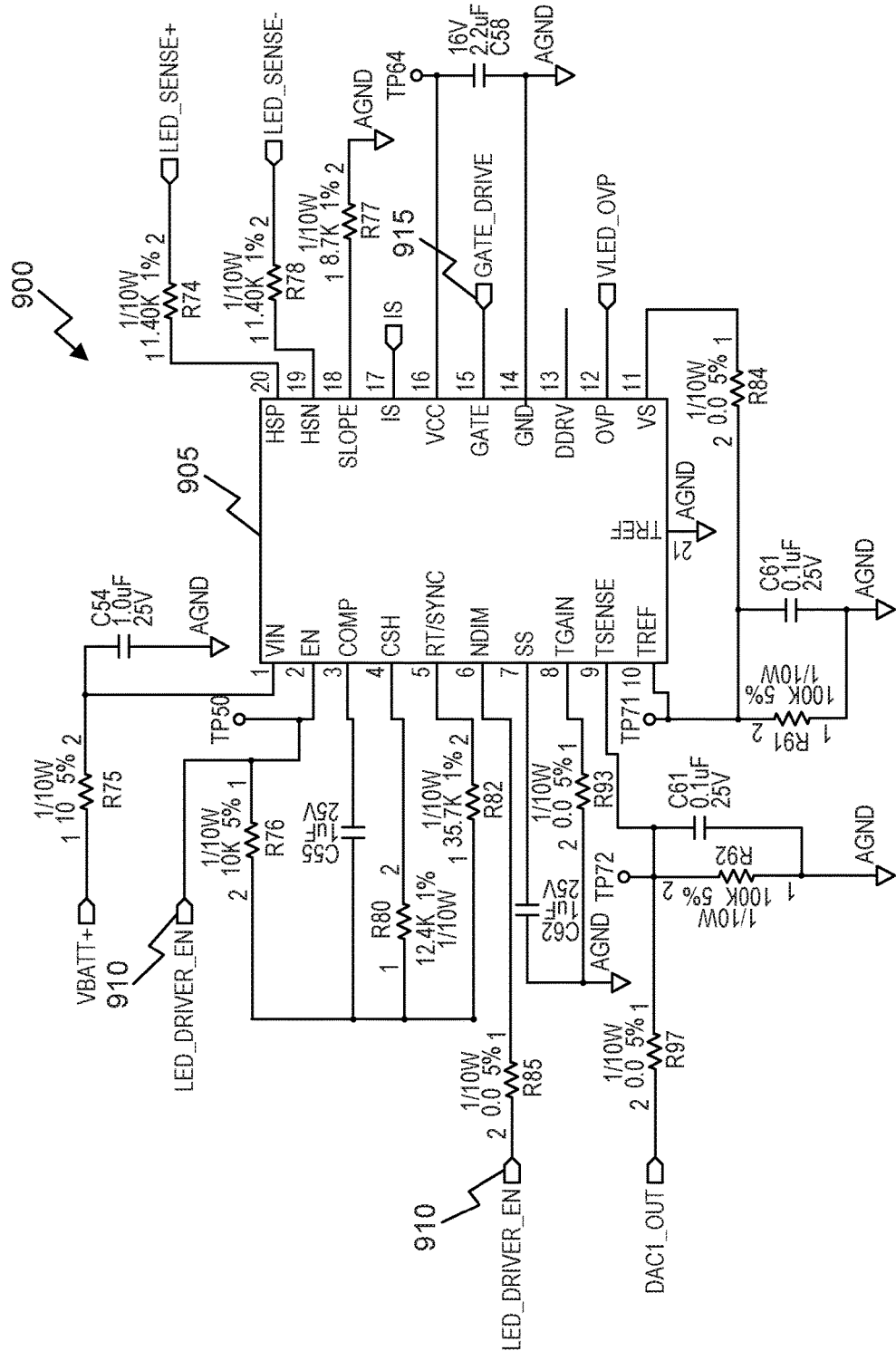
FIG. 16 illustrates an LED IC module of the emergency lighting system of FIGS. 1A and 1B according to some embodiments of the present application.

FIG. 16 illustrates an LED driver IC module 900. The IC module 900 is configured to control the driver 220. The IC module 900 includes LED driver IC 905 having analog dimming interface, NDIM, that enables setting output constant current by providing a reference voltage that is proportional to the desired output current. The output current is then controlled by the GATE DRIVE signal, output from a GATE DRIVE output 915 of the IC 905, as described above with respect to FIG. 14. The LED driver IC 905 may also include LED_DRIVER_EN inputs 910. In some embodiments the LED driver IC 905 is configured to receive one or more signals from the controller 240 at the LED_DRIVER_EN inputs 910. In such an embodiment the one or more signals may enable and/or disable the LED driver IC 905.

Figure 17:
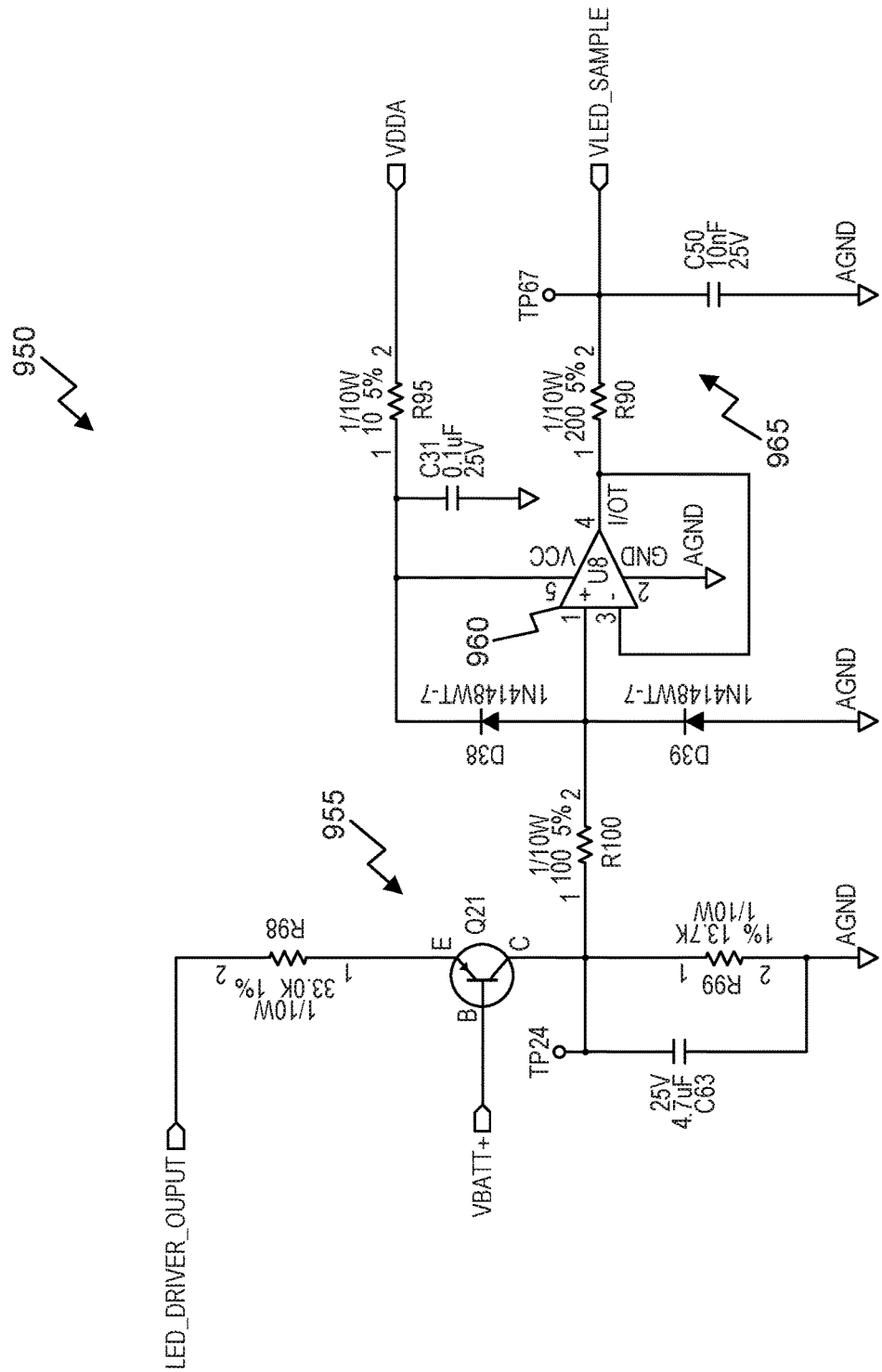
FIG. 17 illustrates a circuit diagram of an LED string voltage detection module of the emergency lighting system of FIGS. 1A and 1B according to some embodiments of the present application.

FIG. 17 illustrates an LED string voltage detection circuit module 950 for monitoring the voltage of the LEDs. The LED_DRIVER_OUTPUT voltage is provided from the light switching circuit module 700 to the LED string voltage detection module 950. The voltage of the LEDS, LED_DRIVER_OUTPUT, is provided to a voltage divider circuit 955 and a non-inverting amplifier 960. The output of the amplifier 960 is filtered by a low-pass RC filter 965 and a sampled battery voltage, VLED_SAMPLE, is provided to the controller 240.

Figure 18:
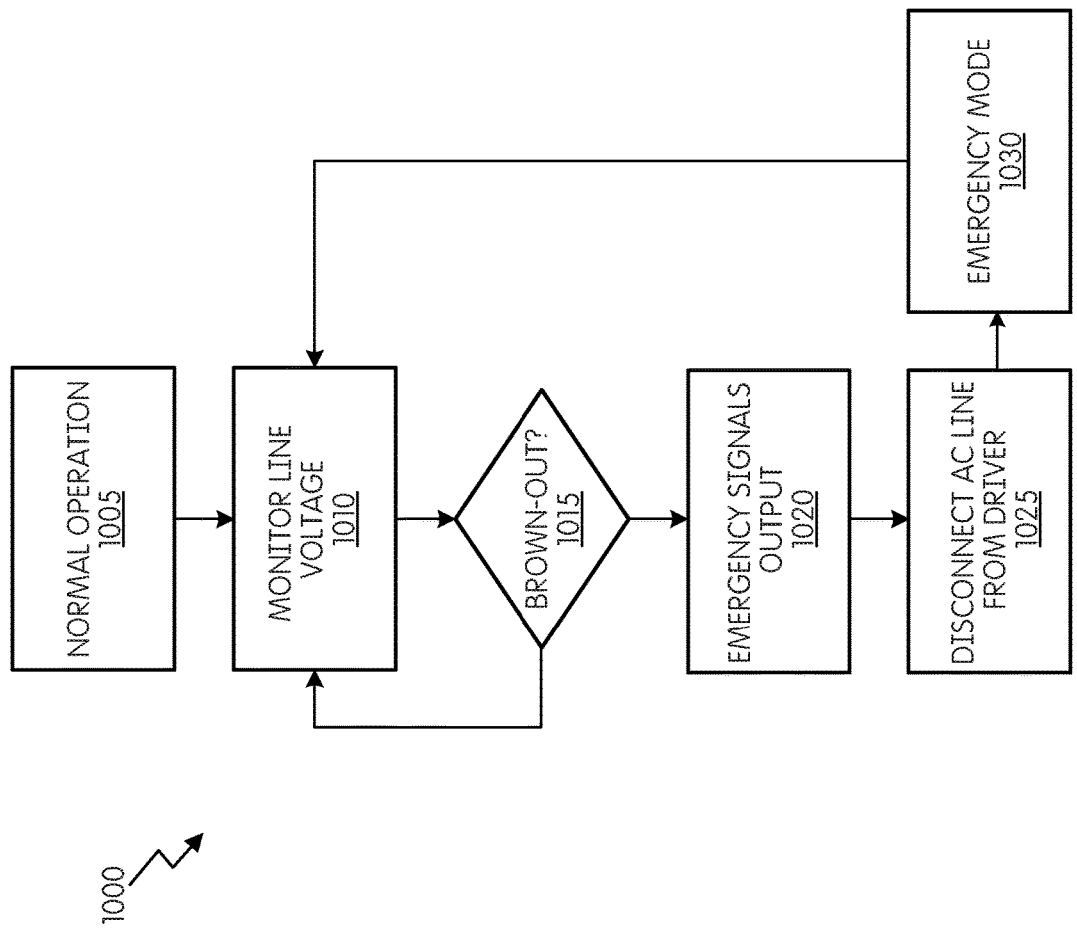
FIG. 18 illustrates a flow chart of an operation of the emergency lighting system of FIGS. 1A and 1B according to some embodiments of the present application.

FIG. 18 is a flowchart illustrating a process 1000 of the system 100 according to some embodiments of the application. In normal operation, both the first light group 115 and the second light group 120 are activated (step 1005). The brown-out module 405 continually monitors the line voltage (step 1010). The brown-out module 405 determines if a brown-out has occurred (e.g., has the line voltage dropped below a threshold) (step 1015). When a brown-out has not occurred (e.g., when the line voltage is above the threshold), process 1000 cycles back to step 1010 and continues to monitor the line voltage. When a brown-out has occurred, emergency mode signals (e.g., activation/deactivation signal and driver activation/deactivation signal) are output to the light switching circuit module 700 and at the driver power switch 800 (step 1020). Once the driver activation/deactivation signal is received at the driver power switch 800, AC line voltage is disconnected from the driver 220 (via the driver power switch 800) (step 1025). Additionally, once the activation/deactivation signal is received at the light switching circuit module 700, emergency mode is entered and power is supplied only to the second light group 120 (step 1030). Process 1000 then cycles back to step 1010 and continues to monitor the line voltage.

Thus, the invention provides, among other things, an emergency lighting system. The emergency lighting system requires less power consumption during brown-out events. By requiring less power consumption during brown-out events, the emergency lighting system may include a relatively small, inexpensive battery. Various features and advantages of the invention are set forth in the following claims.

What is claimed is:

1. An emergency lighting system comprising:
   an input configured to receive a line voltage;
   a charging circuit configured to receive the line voltage and output a charging voltage;
   an auxiliary power supply configured to receive the charging voltage;
   a plurality of lights including a first group of lights and a second group of lights;
   a driver configured to provide power;
   a switching circuit including
      a driver input configured to receive power from the driver,
      an auxiliary power input configured to receive power from the auxiliary power supply,
      an emergency control input, and
      a relay configured, the relay having a first position, in which power from the driver is provided to the first group of lights and the second group of lights, and a second position, in which power from the auxiliary power supply is provided to the second group of lights;
   a controller configured to
      monitor the line voltage,
      compare the line voltage to a threshold, and
      output a signal to the emergency control input when the input voltage is below the threshold;
   wherein, the switching circuit places the relay in the second position upon receiving the signal at the emergency control input.

2. The emergency lighting system of claim 1, wherein the first group of lights are directed in a first direction and the second group of lights are directed in a second direction.

3. The emergency lighting system of claim 2, wherein the first direction and the second direction are the same.

4. The emergency lighting system of claim 1, wherein power is not provided to the first group of lights when the input voltage is below the threshold.

5. The emergency lighting system of claim 1, wherein the first group of lights and the second group of lights are within a housing.

6. The emergency lighting system of claim 5, wherein the charging circuit, the auxiliary power supply, the driver, the switching circuit, and the controller are within the housing.

7. The emergency lighting system of claim 1, wherein the controller is communicatively coupled to a near-field communication device.

8. The emergency lighting system of claim 7, wherein the controller receives operational and control parameters from a user via the near-field communication device.

9. A method of controlling a plurality of lights including a first group of lights and a second group of lights, the method comprising:
   monitoring, via a controller, a line voltage;
   comparing, via the controller, the line voltage to a threshold;
   outputting, via the controller, a signal to an emergency control input of a switching circuit when the line voltage crosses the threshold; and
   placing a relay of the switching circuit into a second position, from a first position, upon the emergency control input receiving the signal;
   wherein power is provided to the to the first group of lights and the second group of lights when the relay is in the first position, and wherein power from an auxiliary power supply is provided to the second group of lights when the relay is in the second position.

10. The method of claim 9, further comprising:
    directing the first group of lights in a first direction; and
    directing the second group of lights in a second direction.

11. The method of claim 10, wherein the first direction and the second direction are equal.

* * * * *